(12) United States Patent
Malaby et al.

(10) Patent No.: US 8,903,795 B1
(45) Date of Patent: Dec. 2, 2014

(54) SYSTEM FOR AUTOMATING THE CREATION OF AN EPISODE OF AN INTERACTIVE SHOW

(75) Inventors: Stephen D. Malaby, Devon, PA (US);
Bryan J. LeBlanc, Hamilton, NJ (US);
Ivan Fokin, Spring City, PA (US); Dow Seng Lam, Princeton, NJ (US); Mateti Siva Ram, Devon, PA (US)

(73) Assignee: Music Choice, Horsham, PA (US)

( * ) Notice: Subject to any disclaimer, the term of this patent is extended or adjusted under 35 U.S.C. 154(b) by 354 days.

(21) Appl. No.: 12/895,282

(22) Filed: Sep. 30, 2010

Related U.S. Application Data

(63) Continuation-in-part of application No. 12/857,255, filed on Aug. 16, 2010, which is a continuation of application No. 12/790,481, filed on May 28, 2010, now abandoned.

(51) Int. Cl.
*G06F 7/00* (2006.01)
*G06F 17/30* (2006.01)

(52) U.S. Cl.
USPC .......................................... 707/706; 707/770

(58) Field of Classification Search
USPC ........................................ 707/765–770, 706
See application file for complete search history.

(56) References Cited

U.S. PATENT DOCUMENTS

2008/0086742 A1* 4/2008 Aldrey et al. .................... 725/24
2008/0320522 A1* 12/2008 Jones ............................... 725/46

* cited by examiner

*Primary Examiner* — Khanh Pham
*Assistant Examiner* — Navneet K Ahluwalia
(74) *Attorney, Agent, or Firm* — Rothwell, Figg, Ernst & Manbeck, P.C.

(57) ABSTRACT

Systems and methods for automating the creation of an episode of a show, such as an interactive video production, are described. In some embodiments, the systems and methods facilitate the creation of an episode of an interactive, music video show.

19 Claims, 21 Drawing Sheets

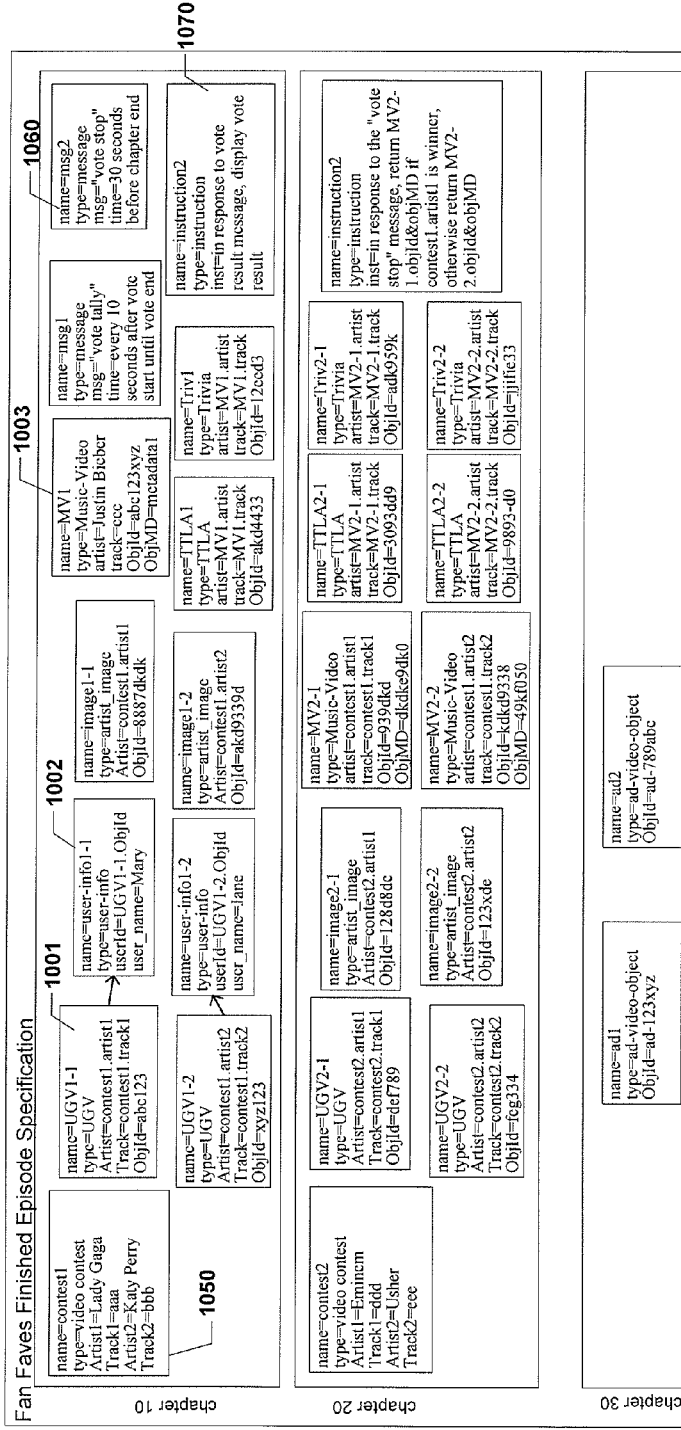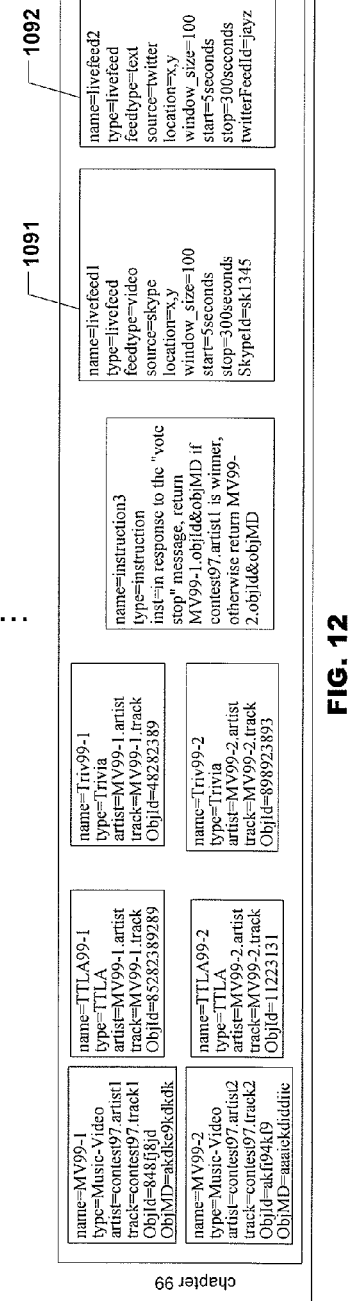
FIG. 12

SYSTEM FOR AUTOMATING THE CREATION OF AN EPISODE OF AN INTERACTIVE SHOW

The present application is a continuation-in-part of U.S. patent application Ser. No. 12/857,255, filed on Aug. 16, 2010 (status pending) (hereafter the "'255 application"), which is a continuation of U.S. patent application Ser. No. 12/790,481, filed on May 28, 2010 (now abandoned). The entire contents of the above identified applications are incorporated by reference herein.

BACKGROUND

The inventions described herein relate to systems and methods for automating the creation of an episode of an interactive show.

SUMMARY

Described herein are various embodiments of systems and methods for automating the creation of an episode of a show, such as an interactive video production. In some embodiments, the systems and methods facilitate the creation of an episode of an interactive, music video show.

In one embodiment, the method is a computer implemented method for producing an episode of a show, which method includes accessing a raw episode specification for an episode of the show. The raw episode specification may include a plurality of object slots, where each object slot comprises information specifying one or more properties of an eligible object. The method may also include performing the following steps for each of the object slots: accessing a database to determine whether a data store includes an object matching the specified properties of the eligible object; in response to determining that no object matching the specified properties of the eligible object exists, issuing an object ticket (e.g., transmitting a message to a predefined address) associated with the object slot; and in response to determining that one or more objects matching the specified properties of the eligible object exists, then selecting one of the one or more objects (e.g., using a predetermined rule to select one of the two or more objects) and persisting in a finished episode specification an identifier identifying the selected object. The method may further include enabling a show automation system to access the finished episode specification.

In some embodiments, the method also includes the steps of: (1) after issuing an object ticket, determining whether the ticket is still outstanding at or after a predetermined point in time; (2) if it is determined that the ticket is still outstanding, then selecting a default object having certain properties in common with the eligible object; and (3) persisting in the finished episode specification an identifier identifying the default object.

In some embodiments, the step using a predetermined rule to select an object comprises: for each of the two or more objects, retrieving information identifying the number of times that the object has been selected since some point in time; and selecting an object from the set that has been selected the least number of times.

In some embodiments, the information specifying the one or more properties of the eligible object comprises one or more attribute values; for each a plurality of objects included in the library, the database stores a set of attribute values corresponding to the object; and the step of accessing the database to determine whether the data store includes an object matching the specified properties of the eligible object comprises accessing from the database attribute values corresponding to an object and comparing the accessed attribute values with the attribute values that specify the properties of the eligible object to determine if there is a match.

In some embodiments, the raw episode specification further comprises an object slot comprising first information specifying one or more properties of a first eligible object and second information specifying one or more properties of a second eligible object, wherein the set of specified properties of the first eligible object are different than the set of specified properties of the second eligible object. In this embodiments, the method may further include: accessing a database to determine whether a data store includes (i) an object matching the specified properties of the first eligible object and (ii) an object matching the specified properties of the second eligible object; in response to determining that no object matching the specified properties of the first eligible object exists, issuing an object ticket associated with the first eligible object; in response to determining that no object matching the specified properties of the second eligible object exists, issuing an object ticket associated with the second eligible object; in response to determining that one or more objects matching the specified properties of the first eligible object exists, then selecting one of the one or more objects and persisting in the finished episode specification an identifier identifying the selected object; and in response to determining that one or more objects matching the specified properties of the second eligible object exists, then selecting one of the one or more objects and persisting in the finished episode specification an identifier identifying the selected object.

In some embodiments, the method also includes creating a schedule using the finished episode specification and a schedule template associated with the show.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 12 illustrates an example finished episode specification.

DETAILED DESCRIPTION

Figure 1:
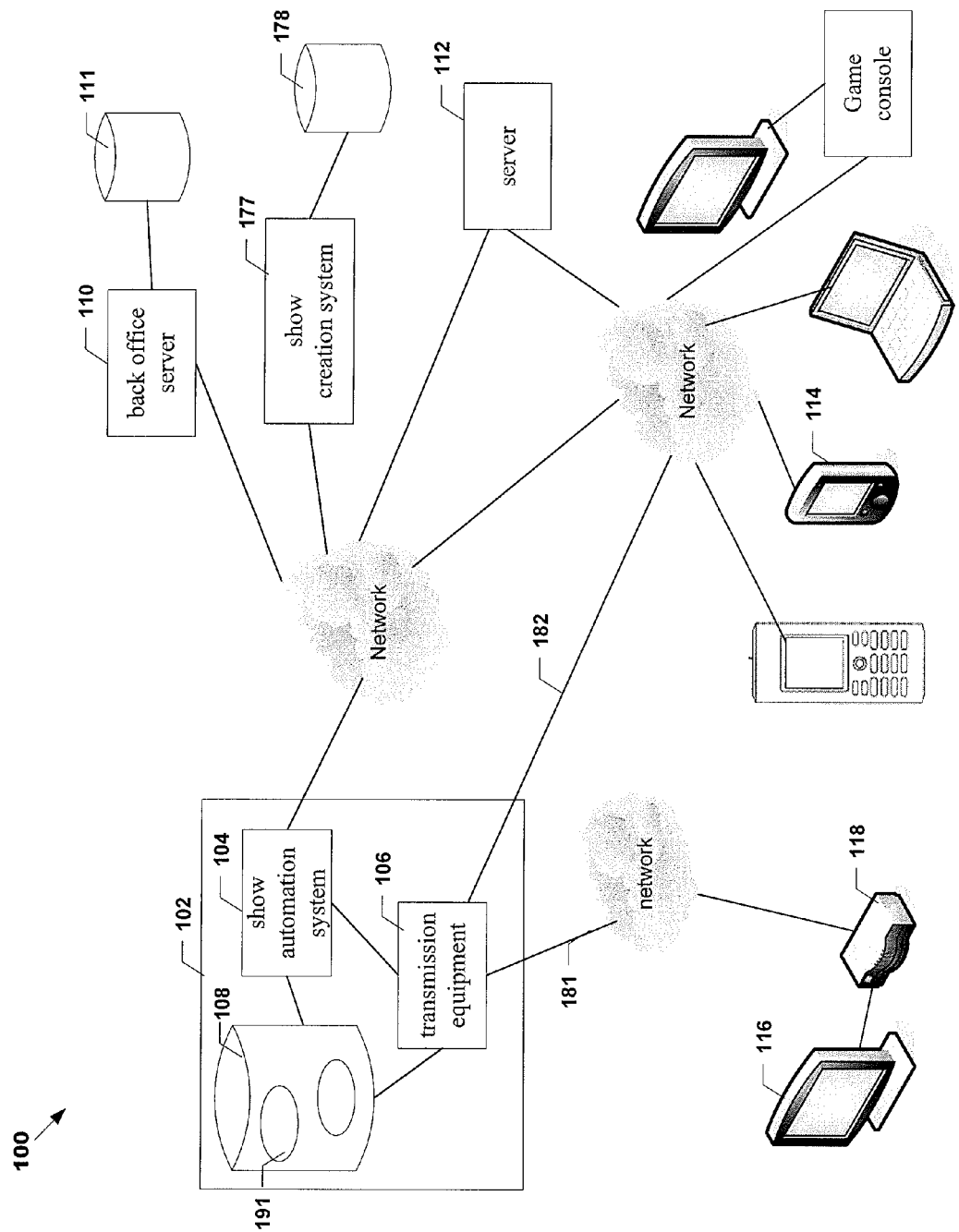
FIG. 1 illustrates an interactive, multi-platform video network according to an embodiment of the invention.

Referring now to FIG. 1, FIG. 1 illustrates an interactive, multi-platform video network (i.e., system) 100 according to an embodiment of the invention. For the sake of simplicity and brevity, we shall assume that system 100 provides a single, interactive, music video channel, but the invention is not limited to a single channel. Nor is there a requirement that the video content be music videos. For example, the video content may be any previously recorded video content or live video content, such as live video from a sporting event (e.g., football game, baseball game, basketball game), concert, newscast, etc.

System 100 includes a show system 102 for outputting one or more video streams for the interactive music video channel. In the example of FIG. 1, system 102 outputs two digital video streams: video stream 181 and video stream 182. In one embodiment, video stream 181 is configured such that is can be processed by a television 116 and/or a passive receiving device (e.g., passive set-top-box) 118 and video stream 182 is adapted such that it can be processed by software running in a broadband capable communication device 114. For example, video stream 181 may be an MPEG video stream that contains a standard definition and/or high definition digital television signal, and video stream 182 may be a Flash Video (FV) video bit stream.

Figure 17:
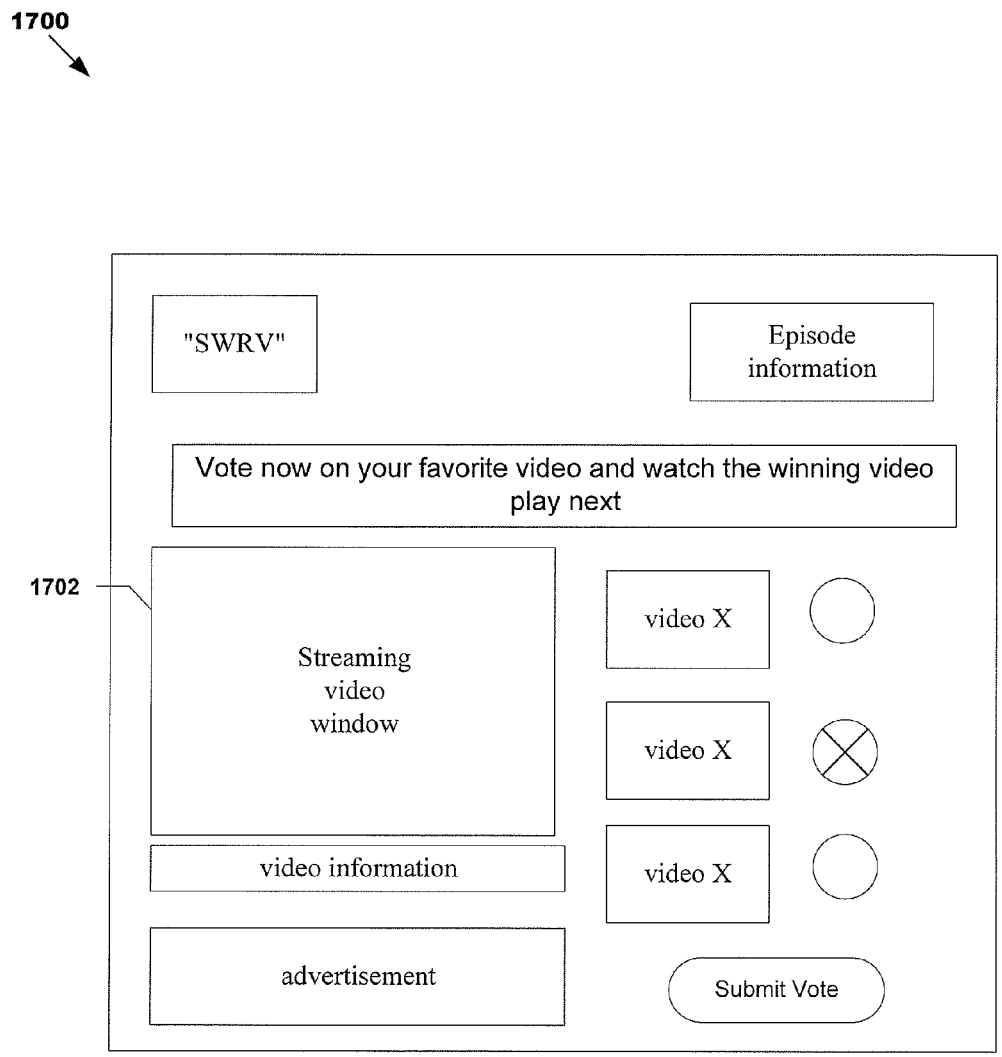
FIG. 17 illustrate an example user interface.

Advantageously, in some embodiments, streams 181 and 182 encode the same video and are output at the same time or substantially the same time (e.g., not more than 5 seconds apart in some embodiments). While streams 181 and 182 may encode the same video, it may be that stream 181 contains additional video elements (e.g., overlay elements) that are not included in stream 182, but in other embodiments the content of stream 182 is the same as the content of 181. By producing the two streams 181, 182, a user of television 116 and a user of communication device 114 can tune to the interactive video channel and watch the same music video at the same time (or substantially the same time). In some embodiments, a user of television 116 tunes to the interactive video channel the same way the user tunes to any television channel. In some embodiments, a user of communication device 114 tunes to the interactive video channel by transmitting a request (e.g., an HTTP GET request) to a server 112, which responds by transmitting to device 114 a certain end user application (i.e., software) that, in some embodiments, may be configured to automatically request and receive stream 182 and display on a display of device 114 (or on a monitor or TV attached to the device) a user interface that includes, among other elements, a window in which the video encoded in stream 182 is displayed. In other embodiments, the end user application does not receive and display the video, but simply displays information related to the interactive channel (e.g., information related to the video that is currently airing in the channel). FIG. 17 is an example of a user interface 1700. In the example shown in FIG. 17, the end user application receives stream 182 and displays in window 1702 the music video encoded in stream 182. As further shown in FIG. 17, user interface 1700 may include, in addition to window 1702, a number of other elements for displaying information to the end user. As discussed herein, the content of user interface 1700 is controlled, at least to some degree, by a show automation system 104.

System 100 is designed such that a program (i.e., a show) provided on the interactive video channel may be interactive. That is, for example, an episode of the program may prompt the user to (1) make a selection (e.g., vote for a video or artist) and/or (2) submit content (e.g., text message, still image, video) that may be selected to appear in an episode of the program. In the embodiments where a user is prompted to vote for a video, the video that receives the most votes may be selected as the next video that will play on the channel. In this way, not only is the channel interactive, but the users may have some control over what primary content will appear on the channel.

As shown in FIG. 1, system 102 includes transmission equipment 106 that is used to produce and output streams 181 and 182. As is known in the art, transmission equipment 106 typically includes devices to composite multiple videos, audios, and onscreen graphics into a single video signal; digital encoding devices to compress the video signal for transmission; and may include devices to multiplex multiple channels (e.g., TV channels or other broadcast channels) for transmission. In one embodiment, transmission equipment 106 includes an Inscriber® graphics platform, a Nexio™ server, and an IconMaster™ master control switcher, all of which are sold by Harris Corporation (whose website is accessible at "www.harris.com")

As further shown in FIG. 1, system 102 also includes a show automation system 104 connected to transmission equipment 106, to communication devices 114 via one or more networks, and to back office server 110. Show automation system 104, in some embodiments, may include the Dynamic Content Scheduler™ and Interactivity Desk™ products available from Never.no of Oslo, Norway (whose website is accessible at "www.never.no").

Advantageously, show automation system 104 is configured to control transmission equipment 106 (e.g., it may control when and what content is transmitted by transmission equipment 106) as well as certain aspects of the end user application (e.g., a video application or other application) running in communication devices 114. In some embodiments, show automation system 104 controls these units by transmitting trigger messages that are received by the units (e.g., messages that cause the units to perform some predefined action based on information in the trigger message). In some embodiments, a schedule is used to control the timing of when the automation system 104 will send a trigger message. The schedule may also contribute to the content of the trigger message. In these embodiments, show automation system 104 accesses one or more schedules 191, which may be stored in a storage device of a storage system 108 (which may include volatile memory units that may be shared by multiple processes or threads as well as non-volatile memory units). In some embodiments, the application running in a communication device 114 that is controlled by automation system 104 is an application that tunes to the interactive video channel (e.g., a video application).

Figure 2:
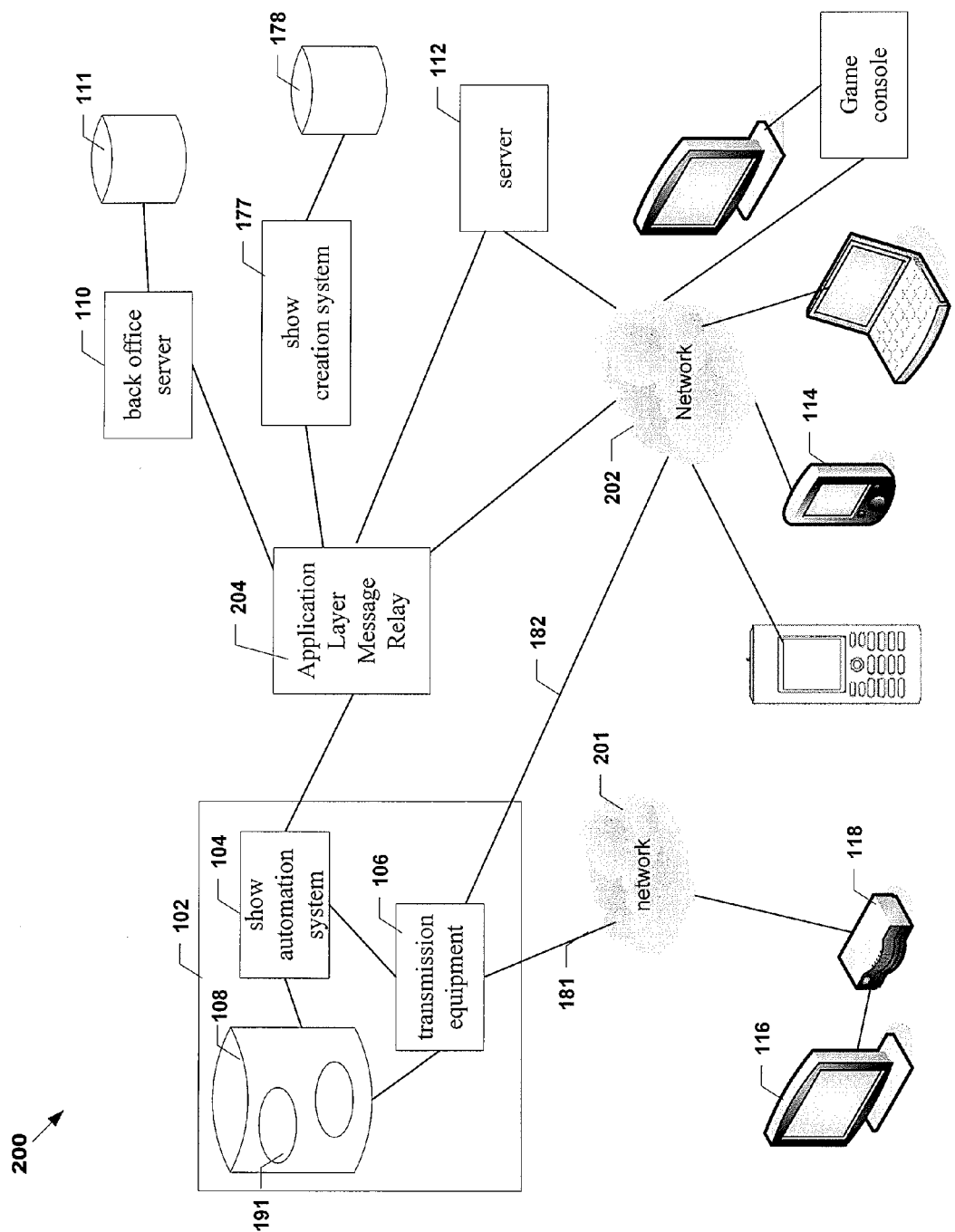
FIG. 2 illustrates an interactive, multi-platform video network according to another embodiment of the invention.

Referring now to FIG. 2, FIG. 2 illustrates one specific possible implementation of system 100. As shown in FIG. 2, transmission equipment 106 is connected to a TV distribution network 201 (e.g., satellite TV network, cable TV network, etc.) to which TV 116 is also connected. In the example shown TV 116 is connected to network 201 via STB 118, but this is not a requirement as some TVs have the capability of connecting to network 201 directly. As further shown, transmission equipment 106 is also connected to the Internet 202 (e.g., by way of a content delivery network (CDN)), to which communication devices 114 are also connected. In the embodiment shown in FIG. 2, a user of communication device 114 tunes to the interactive video channel by transmitting a request (e.g., an HTTP GET request) to server 112, which responds by transmitting to the device 114 a certain application that, in some embodiments, may be configured to, among other things, automatically send a request to a server in CDN 202, which responds to the request by relaying stream 182 to the application.

As further shown in FIG. 2, system 200 may employ a message relay 204 for relaying application layer messages (e.g., the trigger messages discussed above). For instance, when automation system 104 is directed by schedule 191 to transmit a certain trigger message, automation system may simply provide the message to message relay 204 and then message relay 204 will retransmit the message (e.g., using a multicast transmission) so that it is received by server 110 and/or all the communication devices 114 that should receive the message. In some embodiments, message relay 204 implements a publish/subscribe model. In this model the sender of a message (e.g., automation system 104) does not need to know how many or the addresses of the receivers (e.g., communication devices 114, server 110), and the receivers do not need to have knowledge of the original sender. The message relay 204 is responsible for figuring out where messages should go. One common method of accomplishing this is to have the senders and receivers register with message relay 204.

Figure 3:
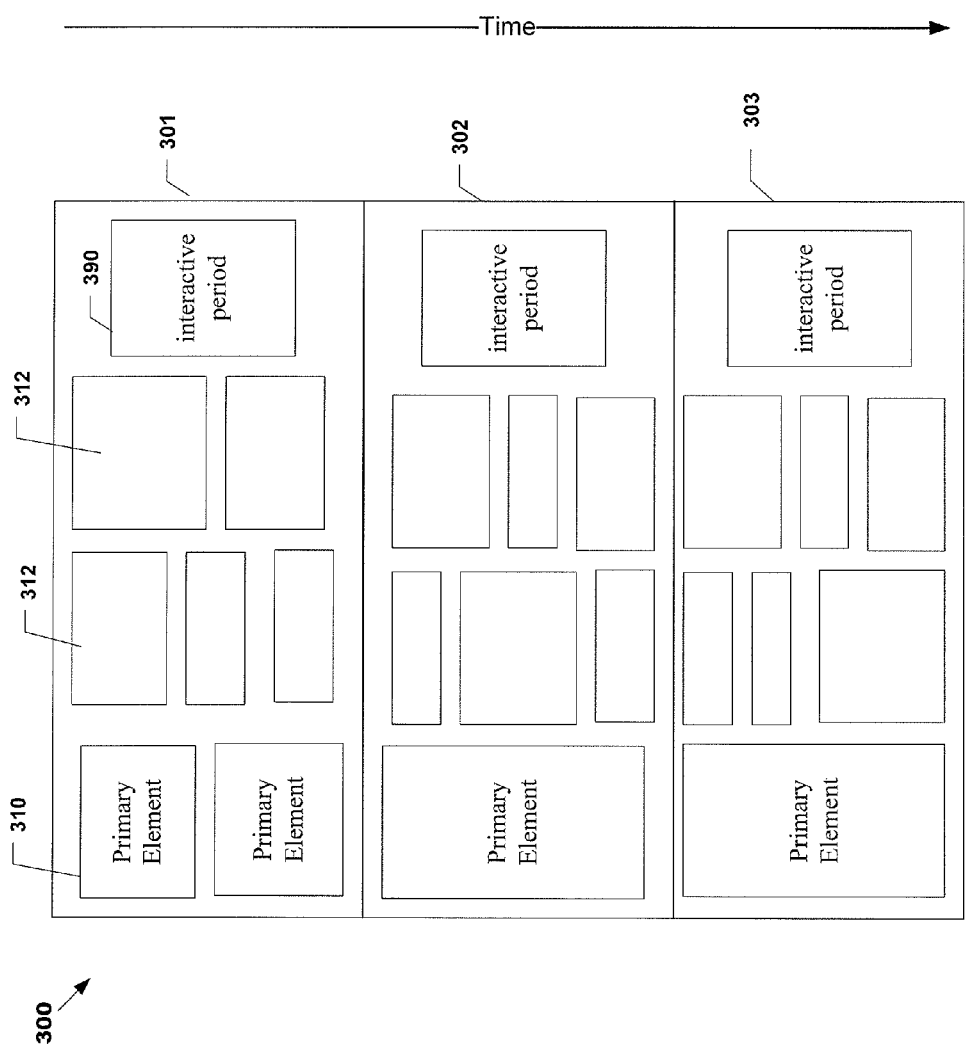
FIG. 3 illustrates components of an episode of an interactive show.

Referring now to FIG. 3, FIG. 3 is a block diagram for illustrating an example episode 300 of an example interactive, voting enabled, video program (e.g., interactive music video show) that is carried on the interactive video channel. Episode 300 has one or more chapters. In the example shown, episode 300 has three chapters (i.e., chapters 301, 302, 303). Each of these chapters includes a (i.e., at least one) primary video element 310 (in this case a particular music video), a plurality of secondary video elements 312 (e.g., overlay elements or control functions, such as video squeeze backs, audio ducking, etc.). Each overlay secondary video element can convey, for example, any one or more of the following: (a) information about the interactive video channel (e.g., a logo associated with the channel), (b) information about the primary video element (e.g., the name of the artist, the title of the song, etc.), (c) information regarding an interactive feature of the show (e.g., information regarding the choices (e.g., music videos or artists) the viewers can select or information about a poll), (d) information about voting (e.g., the current vote tally), and (e) prompts to the viewers to submit their own content. Additionally, a control function secondary video element may have some affect on (a) the primary element (e.g., ducking or squeeze back of the primary element), (b) the output signal (e.g. trigger for ad insertion downstream), or (c) external devices (e.g. back office servers 110).

For some shows, the duration of the primary video element 310 is usually the duration or close to the duration of the chapter in which the primary element 310 falls. For these type of shows, the duration of the secondary video elements may vary. Some secondary video elements (e.g., a channel identifier still image overlay) may have a duration as long as the chapter (or longer), while others (e.g., squeeze back) may have relatively short durations (e.g., 10 seconds). As shown in FIG. 3, each chapter of the example episode may have an interactive period 390 (e.g., a period of time during which a user may cast a vote for one of the available choices—typically a set of two or more titles or artists or interact in some other way) that usually begins shortly after the start of the primary video and usually ends shortly before the end of the primary element 310 (e.g., in the range of 1 to 60 seconds before the end of the primary video), but, in some embodiments where the next primary element 310 is a commercial, the interactive period 390 may continue after the end of the first primary element 310 so that, for example, voting may occur during the commercial break.

Figure 4:
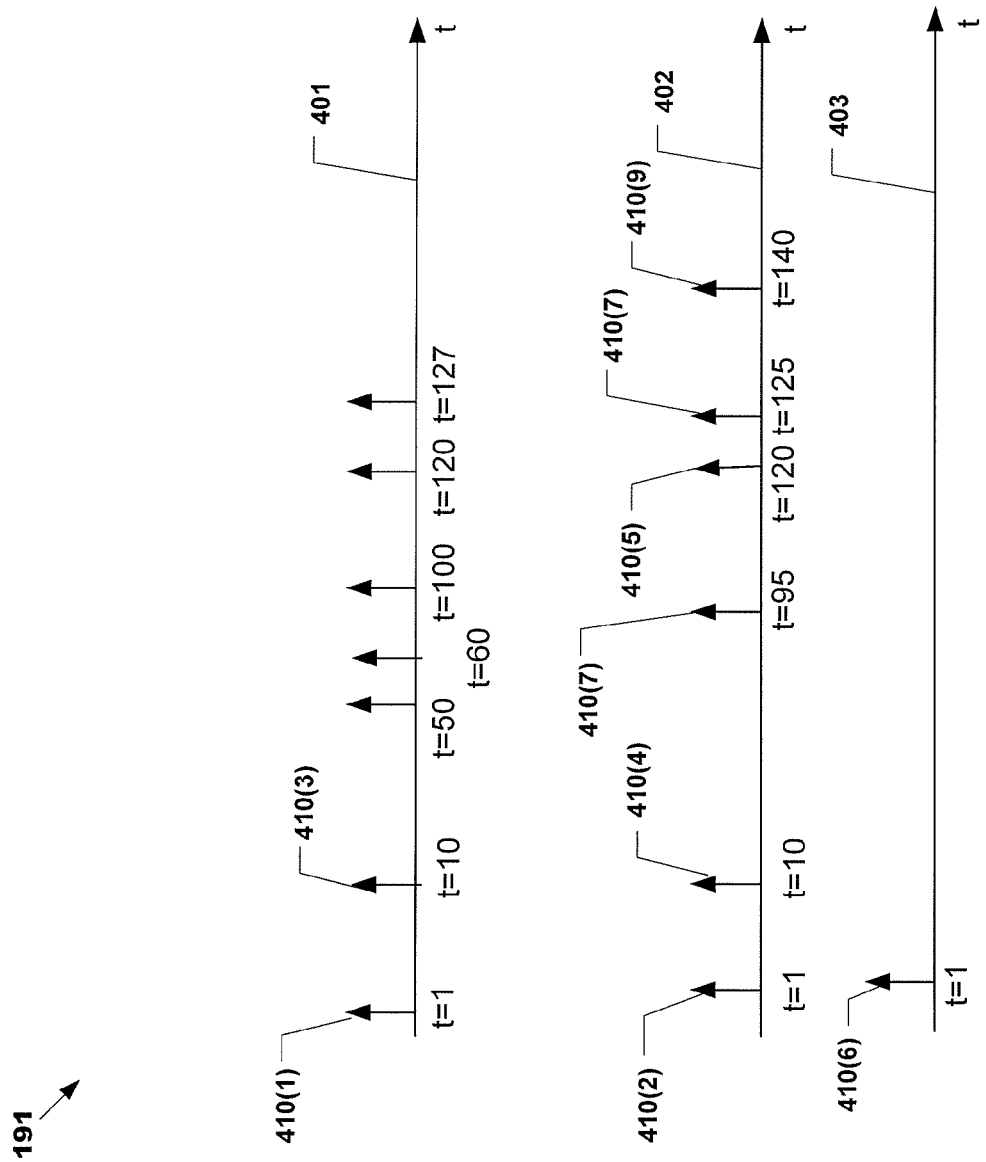
FIG. 4 represents a schedule for use by a show automation system.

As discussed above, a schedule is used to control automation system 104 (e.g., control when system 104 will send a trigger message). A schedule may comprise a set of data objects, where each data object is associated with a particular point in time and may contain information that instructs automation system 104 to take one or more particular actions. Referring now to FIG. 4, FIG. 4 conceptually illustrates a schedule 191. In this example, schedule 191 is a schedule for a chapter of an episode of a show. In the example shown, schedule 191 includes three time lines: a time line 401 for transmission equipment 106, a time line 402 for external systems (e.g., communication devices 114, back office server 110, dynamic scheduler 1202, which is shown in FIG. 12), and a procedure time line 403. This is for illustrative purposes, as one of ordinary skill in the art would appreciate upon reading this disclosure that one time line is sufficient, but any number may be used.

Each time line 401, 402, 403 includes one or more triggers 410 (represented by the upward arrows) and each trigger is located at a specific point on the time line, which represents a specific point in time (e.g., an absolute point in time (e.g., Jan. 23, 2011 at 1:00 PM GMT) or a relative time (e.g., 10 seconds after some event)), and is, or is associated with, a data object (e.g., a set of data that may include a set of attribute-value pairs). When the specific point in time at which a trigger is located is reached, the automation system will take an action based on information associated with the trigger (e.g., based on the data object associated with the trigger). In the example shown, trigger 410(1) is a "video start" trigger. Associated with this trigger may be a unique video identifier identifying a particular video file containing a particular video (e.g., an artist's music video or a user generated video (UGV)). In some embodiments, each trigger on line 401 is associated with either a primary element 310 or a secondary element 312, each trigger on line 402 is associated with a control function secondary element 312, and each trigger on line 403 is associated with a procedure (e.g., some computer code that is designed to perform a certain task).

When trigger 410(1) is reached (i.e., when the current time matches the time at which trigger 410(1) is located), automation system 104 may transmit to transmission equipment a "video start" trigger message, which may include the unique video identifier. In response, transmission equipment 106 may use the video identifier to retrieve from storage 108 the identified video file, queue the file for transmission, and then produce and transmit streams 181, 182 such that the streams contain the contents of the file (e.g., an encoded variant thereof). Trigger 410(2), in this example, is also a "video start" trigger. When trigger 410(2) is reached, automation system 104 may transmit (directly or indirectly) a "video start" trigger message, which may include the unique video identifier, to communication devices 114 and to server 110 via, for example, application layer messaging relay 204. Trigger 410(6), in this example, is configured such that when procedure trigger 410(6) is reached, a particular procedure (e.g., software module) is activated. The particular procedure may be a procedure that, when activated, monitors, for example, a count (e.g., a vote count) and then takes some action when the count reaches or exceeds a threshold. The action that the procedure takes may be transmitting a message to equipment 106 that causes it to add/remove an overlay from video stream 181/182, transmitting a message to devices 114, and/or adding triggers to time line 401 and/or 402.

The other triggers shown on time line 401 are related to the secondary elements of the chapter. For example, trigger 410 (3) may cause automation system 104 to send a trigger message to equipment 106 that causes equipment 106 to add to video stream 181 an overlay element (e.g., a still image, an animation, a video) that informs the user that the user may submit a vote for the next video to play. Other triggers on time line 402 (e.g., triggers 410(4), 410(5), 410(7), 410(9)) cause automation system 104 to send to server 110 a "vote start" message, a "vote stop" message, a "vote result request" message, and a "video stop" message respectively.

Figure 5:
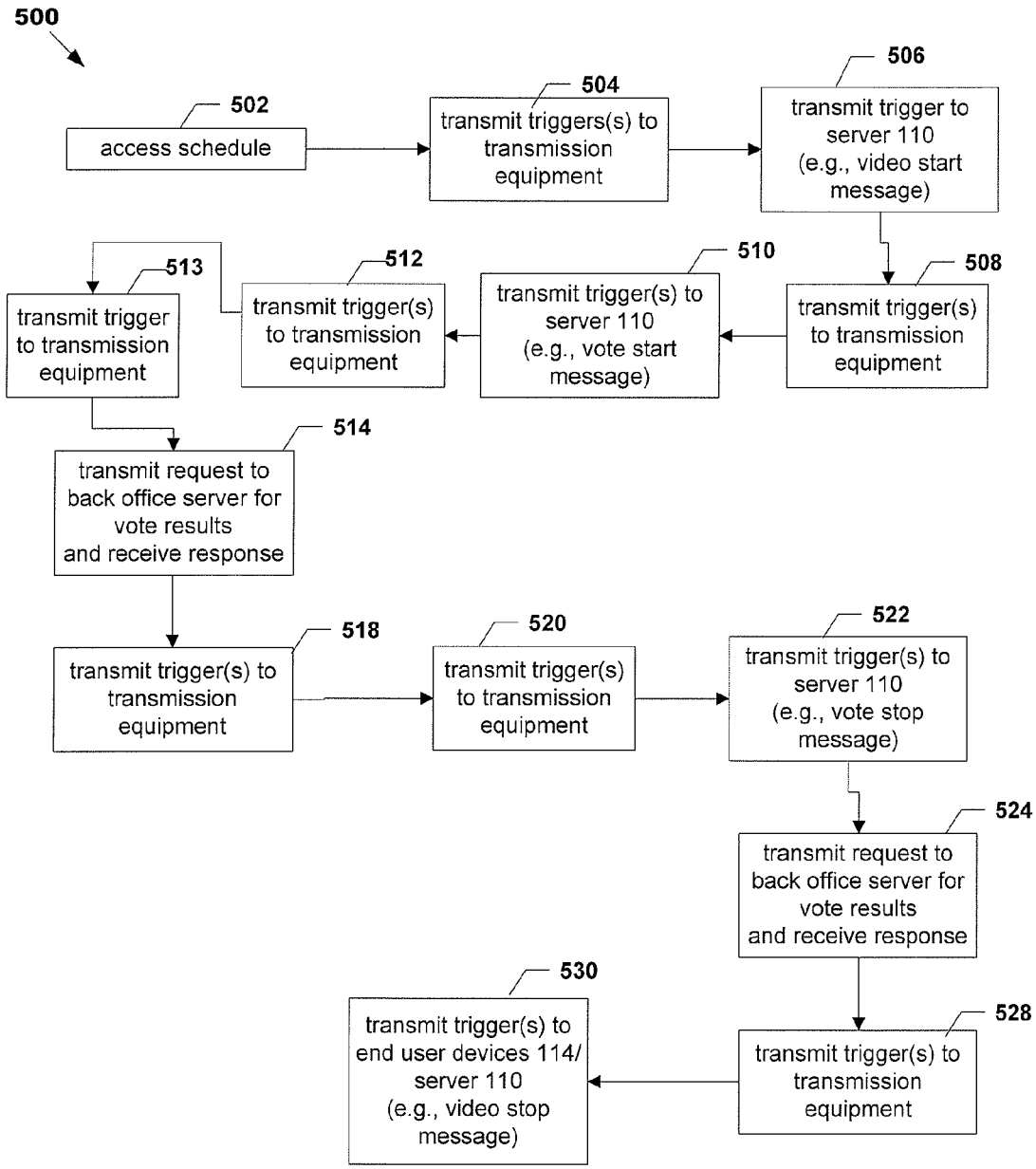
FIG. 5 is a flow chart illustrating a process, according to an embodiment, that is performed by a show automation system.

Referring now to FIG. 5, FIG. 5 is a flow chart illustrating an example process 500 that is preformed by automation system 104 as a result of the schedule shown in FIG. 4. Process 500 starts at step 502, where automation system 104 accesses schedule 191 shown in FIG. 4 and performs actions as instructed by the schedule. That is, at time t=1, automation system 104 transmits video start message 601 (see the message flow diagram shown FIG. 6) to equipment 106 (step 504) and transmits video start message 602 to devices 114 and server 110, respectively (step 506). At time t=10, automation system 104 transmits to equipment 106 a trigger message 603 related to a secondary element (step 508) and transmits vote start message 604 to devices 114 and server 110 (step 510). At time t=50, automation system 104 transmits to equipment 106 a trigger message 608 related to a secondary element (step 512). Message 608 may cause equipment to overlay an overlay element. At time t=60, automation system 104 transmits to equipment 106 another trigger message 609 related to the secondary element (step 513). Message 609 may cause equipment to stop the overlay of the overlay element. At time t=95, automation system 104 transmits to back office server 110 a request message 610 requesting the current voting results and receives a response message 612 containing the voting results (step 514). At time t=100 (step 518), automation system 104 transmits to equipment 106 a trigger message 614 that causes equipment 106 to add to video stream 181 information identifying the current vote tally. At time t=120, automation system 104 transmits to equipment 106 a trigger message 615 related to a secondary element (step 520) and transmits vote stop message 616 to devices 114 and server 110 (step 522). At time t=125, automation system 104 transmits to back office server 110 a request message 618 requesting the final voting results and receives a response message 620 containing the voting results (step 524). Next (step 528), at time t=127 automation system 104 transmits to equipment 106 a trigger message 622 that causes equipment 106 to add to video stream 181 an overlay containing information identifying the vote winner so that a viewer using TV 116 to view the channel can see the voting result. Next (step 530), system 104 transmits a video stop message 624 to devices 114 and server 110.

Figure 6:
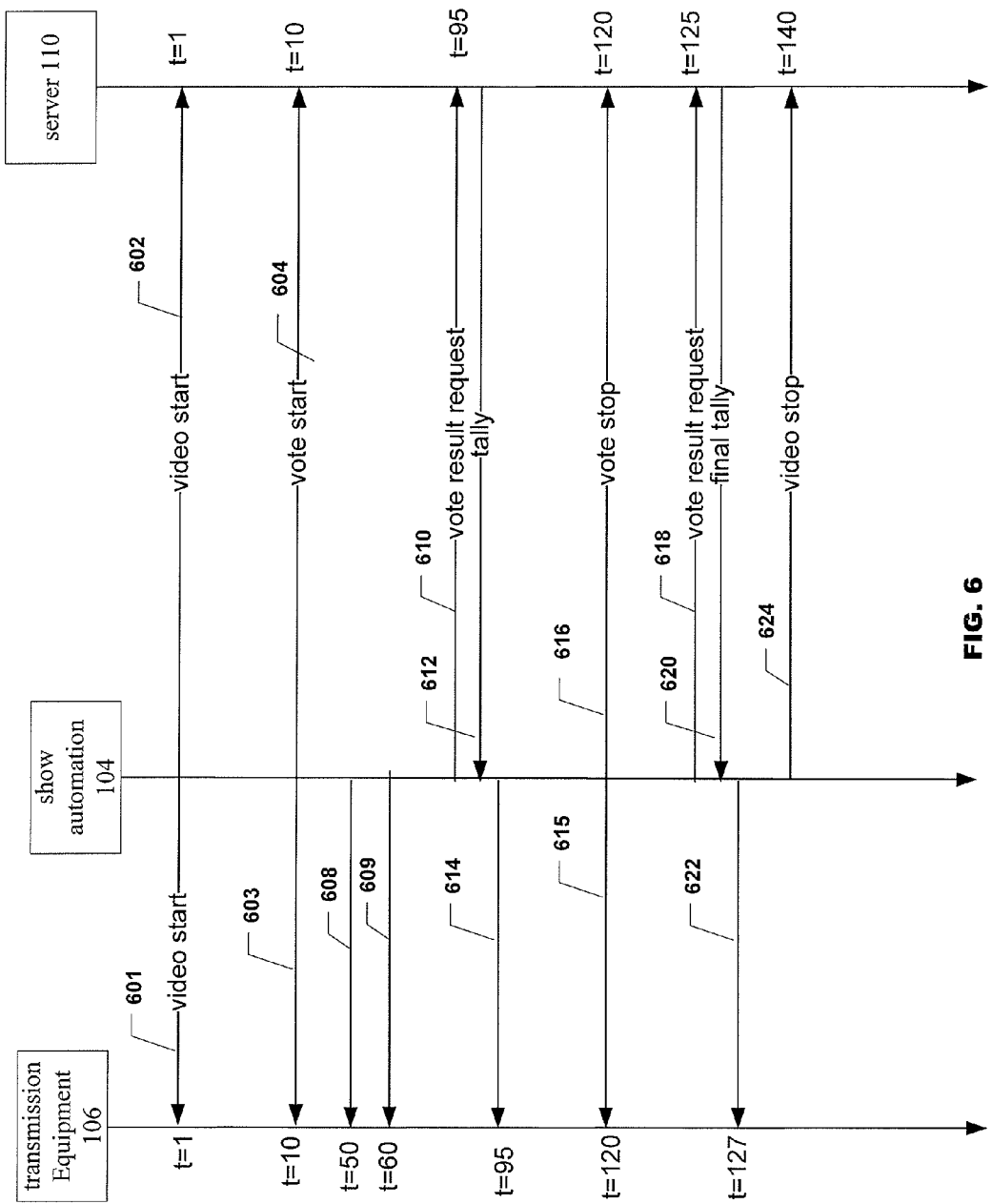
FIG. 6 is a message flow diagram showing an example message flow.

As indicated in FIG. 6, vote stop message 616 preferably is transmitted prior to the point in time at which the currently playing video ends (e.g., between 1 and 60 seconds before the end of the video) This is done so that the winner of the vote can be determined prior to the end of the currently playing video. If what is being voted on is the next video that will play, it is, in some embodiments, important that the winning video be known prior to the end of the current chapter so that there is no (or only a small amount of) dead time between chapters.

Figure 18:
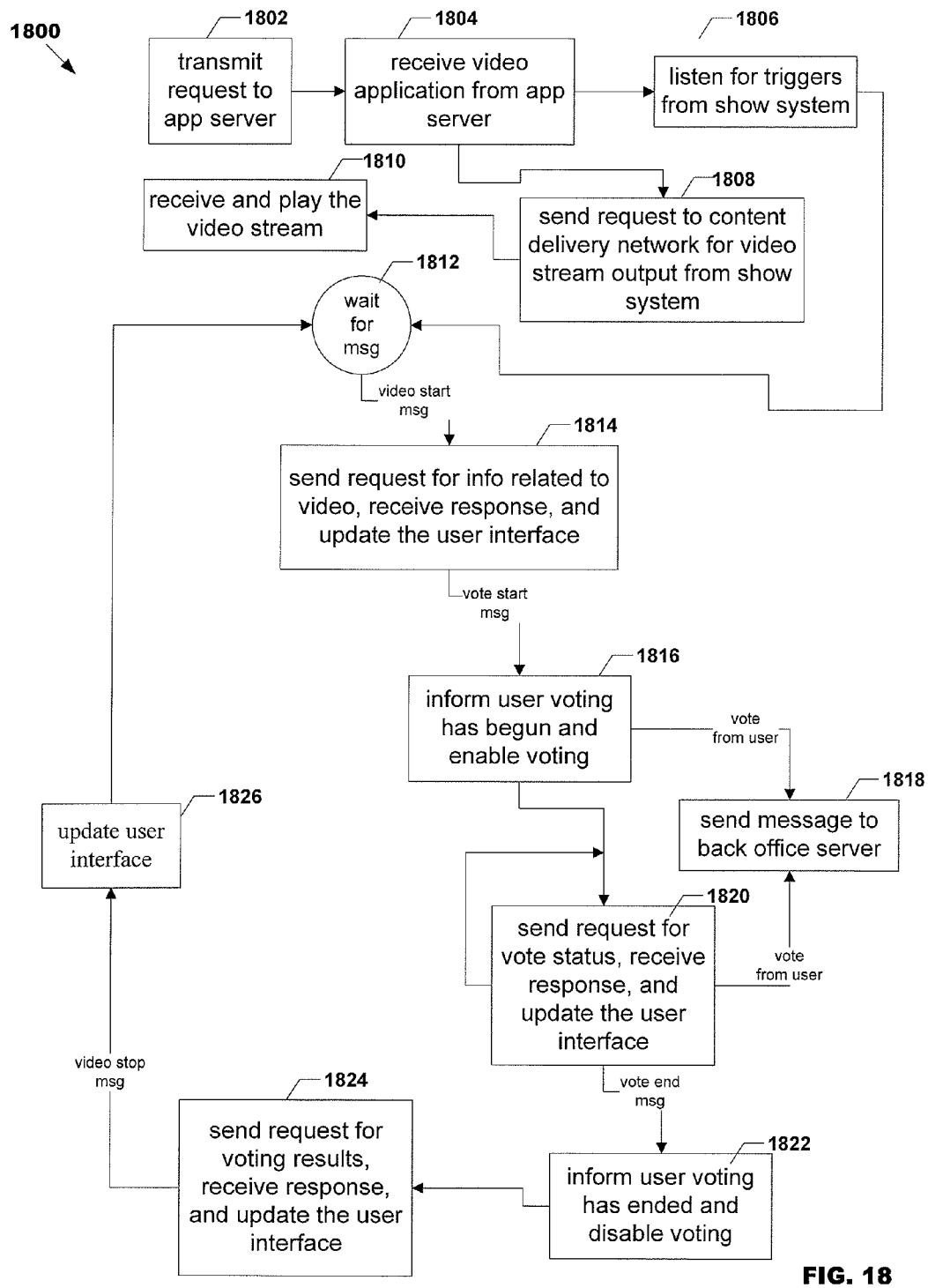
FIG. 18 is a flow chart illustrating a process, according to an embodiment of the invention, performed by a communication device.

Referring now to FIG. 18, FIG. 18 is a flow chart illustrating a process 1800 performed by a device 114. Process 1800 may begin in step 1802 where device 114 transmits to sever 112 a request message 1902 (see the data flow diagram shown in FIG. 19) (e.g., an HTTP GET request). In response, device 114 receives from the server an application 1904 (step 1804). In some embodiments, the application consists of an HTML file transmitted to device 114 in response to the request message 1902 plus all of the objects (e.g., javascript code, flash objects, java applets, etc.) that the HTML file causes device 114 to download.

Figure 19:
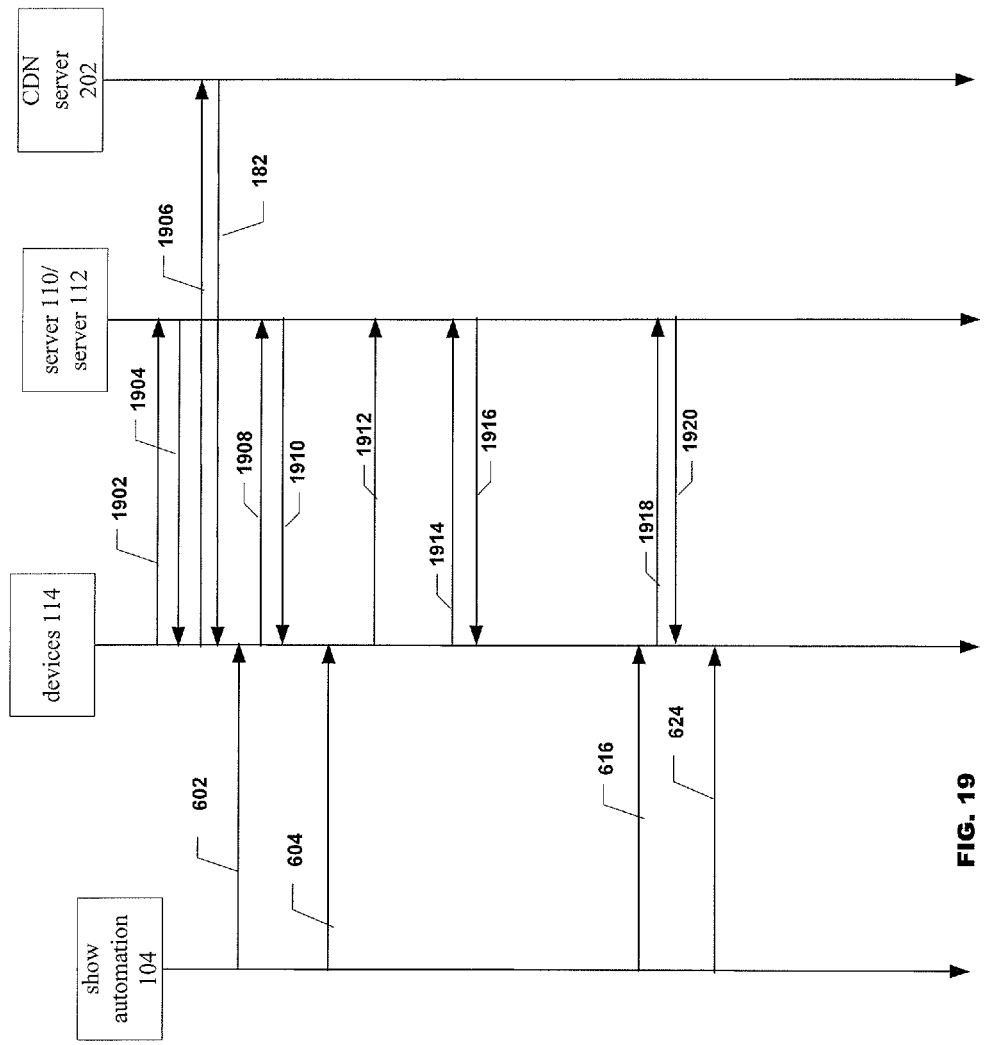
FIG. 19 is a message flow diagram showing an example message flow.

In step 1806, the application listens for trigger messages from automation system 104. For example, in step 1806, the application may register with message relay 204 and subscribe to messages sent by automation system 104, or it may simply listen for and accept messages addressed to a certain address or port (as depicted in FIG. 19).

In step 1808, the application generates and displays on a display of device 114 a user interface and may transmit to a sever of CDN 202 a request 1906 for the video stream 182 output by broadcast system 102. In step 1810, the application receives and plays the video stream (e.g., it displays in a window of the user interface the video encoded in stream 182). While step 1810 is occurring, the other steps of process 1800 may proceed in parallel.

In step 1812, application waits for one or more trigger message(s) from automation system 104. For the sake of simplicity, we will assume that application performed step 1812 immediately prior to automation system transmitting video start trigger message 602 so that the first message received by application is message 602. In response to receiving the video start trigger message 602, the application sends to a server (e.g., server 110/112) a request 1908 for information associated with the video identified in the video start trigger message, receives the information 1910, and updates the user interface so as to include information received from the server (e.g., the information may include title information, artist information, trivia regarding the video, etc) (step 1814).

In response to receiving vote start trigger message 604 from automation system 104, the application updates the user interface to inform the user that the user may vote for a candidate (e.g., a candidate music video) (step 1816). After step 1816, application will perform step 1818 in response to the user voting and may periodically perform step 1820. In step 1818, the application sends a message 1912 to server 110. Message 1910 contains information indicating the candidate for which the viewer voted. In step 1820, the application sends to server 110 a request message 1914 requesting the current vote tally, receive a response message 1916 indicating the current vote tally, and updates the user interface to reflect the current vote tally. Steps 1822, 1824 will be performed in response to the application receiving a vote stop message 616. In step 1822, the application updates the user interface to inform the user that voting has ended and disables voting. In step 1824, the application sends to server 110 a request message 1918 requesting the final vote tally, receive a response message 1920 containing the final vote tally, and updates the user interface to inform the user of the final vote tally. After step 1824, the application will perform step 1826 in response to receiving a video stop trigger message 624. In step 1826, the application may update the user interface to indicate that the video that was playing has ended.

Figure 7:
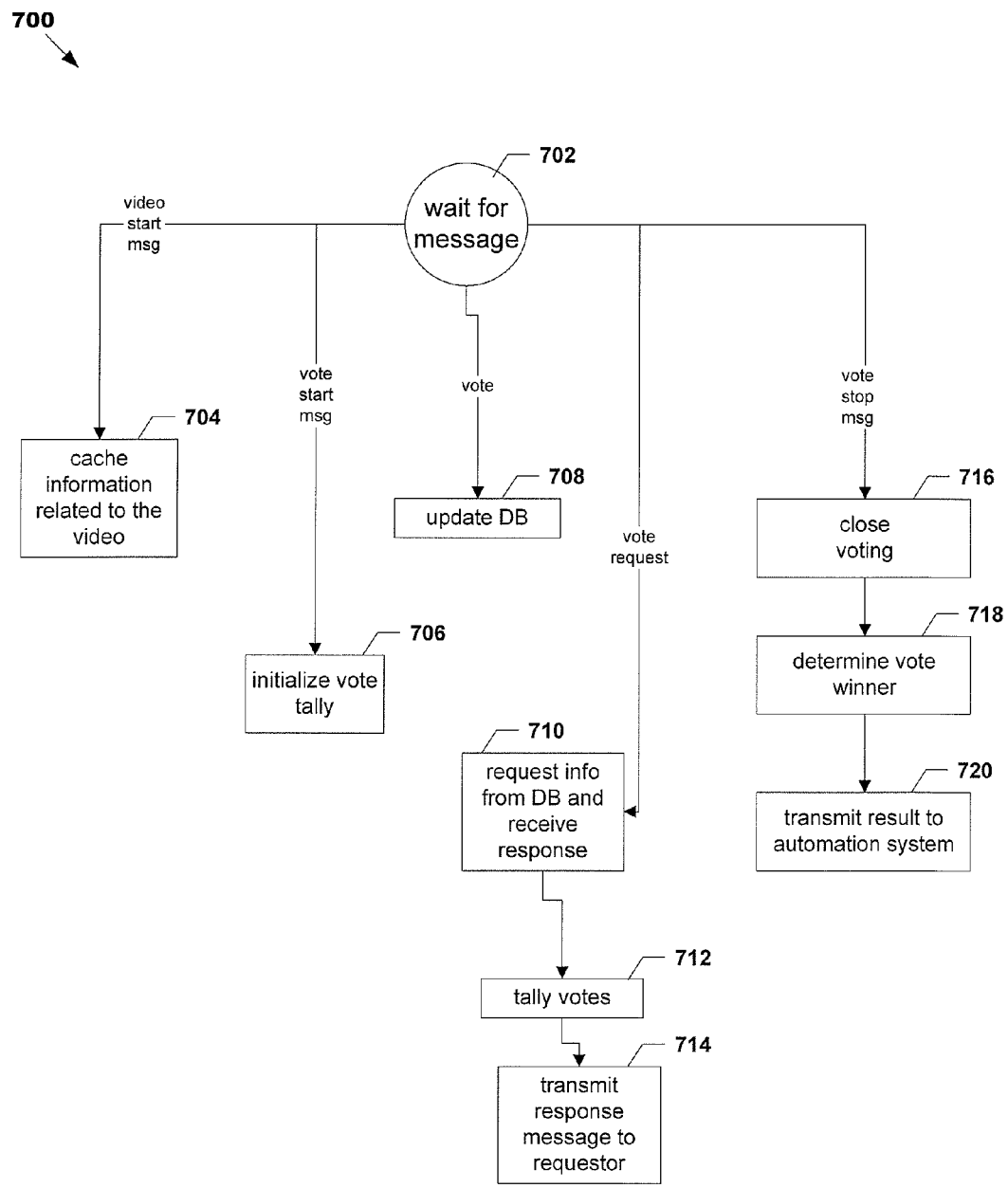
FIG. 7 is a flow chart illustrating a process, according to an embodiment, that is performed by a back office server.
Figure 8:
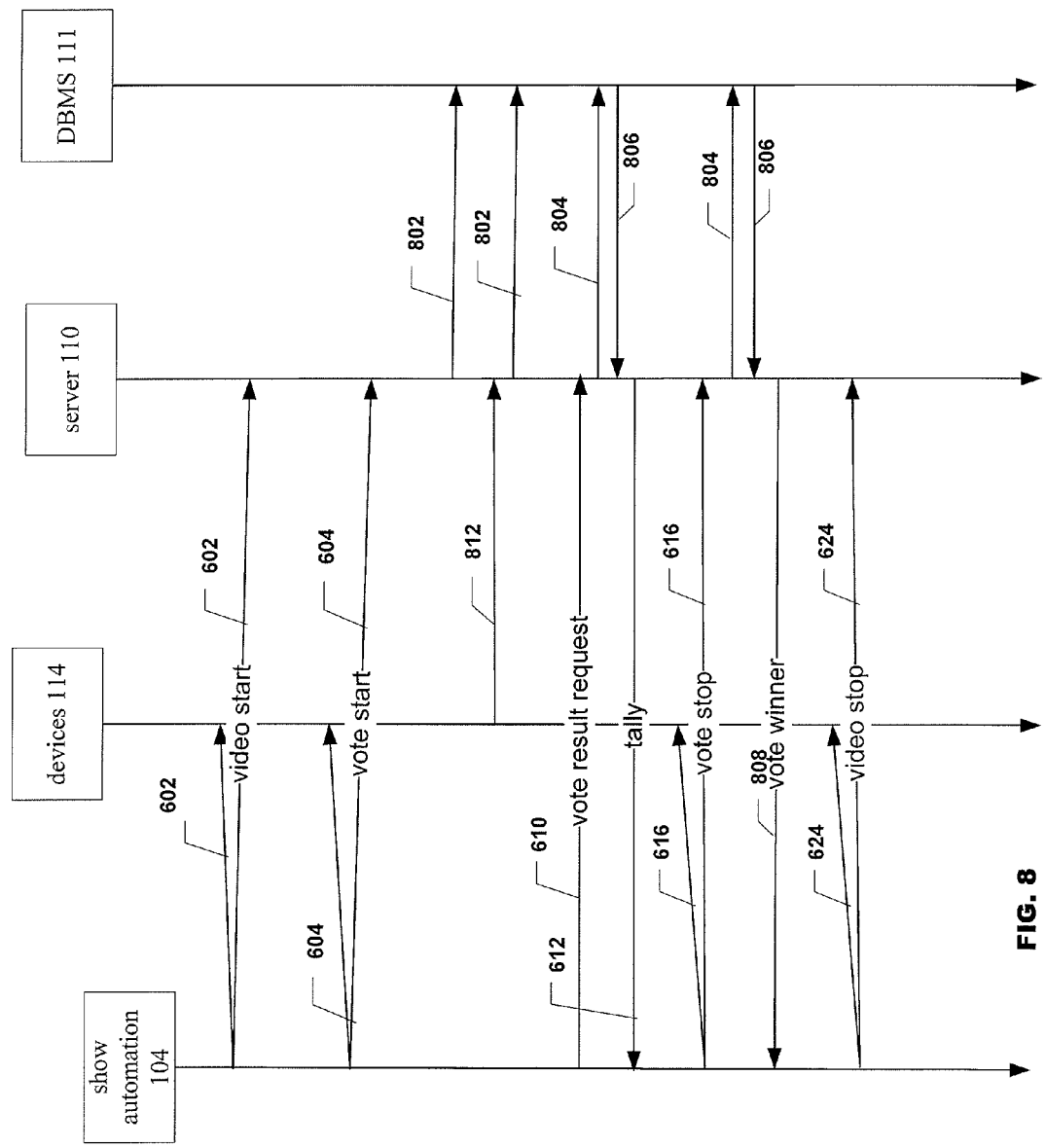
FIG. 8 is a message flow diagram showing an example message flow.

Referring now to FIG. 7, FIG. 7 is a flow chart illustrating a process 700 performed by server 110. Process 700 may begin in step 702, where server 110 waits for a message. In response to a video start message 602, server 110 performs step 704. In step 704, server 110 may copy into a data store (e.g., a cache) information associated with the video identified in the message. For example, in step 704, server 110 may push the information to servers 112, which will then store the information locally. This is done because a device 114 that receives message 602 may send to server 110/112 a request for the information and the information can be provided more quickly to device 114 if the information is cached.

In response to a vote start message 604, server 110 performs step 706. In step 706, server 110 initializes a vote (e.g., initializes and/or creates resources—such as database resources (message 801)—for storing voting information).

In response to a vote message 812, server 110 performs step 708. In step 708, server 110 updates the database 111 to reflect the vote. For example, server 110 may use one database record for recording votes for one candidate and another database record for recording votes for another candidate, and in step 708 server 110 will update the appropriate record by transmitting an update message 802 to database 111.

In response to a vote request message 610, server 110 performs steps 710-714. In steps 710-714, server 110 will request vote information from the database (e.g., submit query 804 to database 111), receive from the database a response 806 that may include the total number of votes received for each candidate, tally the current vote count, and transmit to the requestor a response message 612 containing the computed vote tally.

In response to a vote stop message 616, server 110 performs steps 716-720. In steps 716-720, server 110 closes the polls (e.g., does not accept any more votes), sends a query 804 to the database, receives the response 806, determines the vote winner based on information in the response 806, and, in some embodiments, transmits to automation system 104 a message 808 that identifies the winner.

Figure 20:
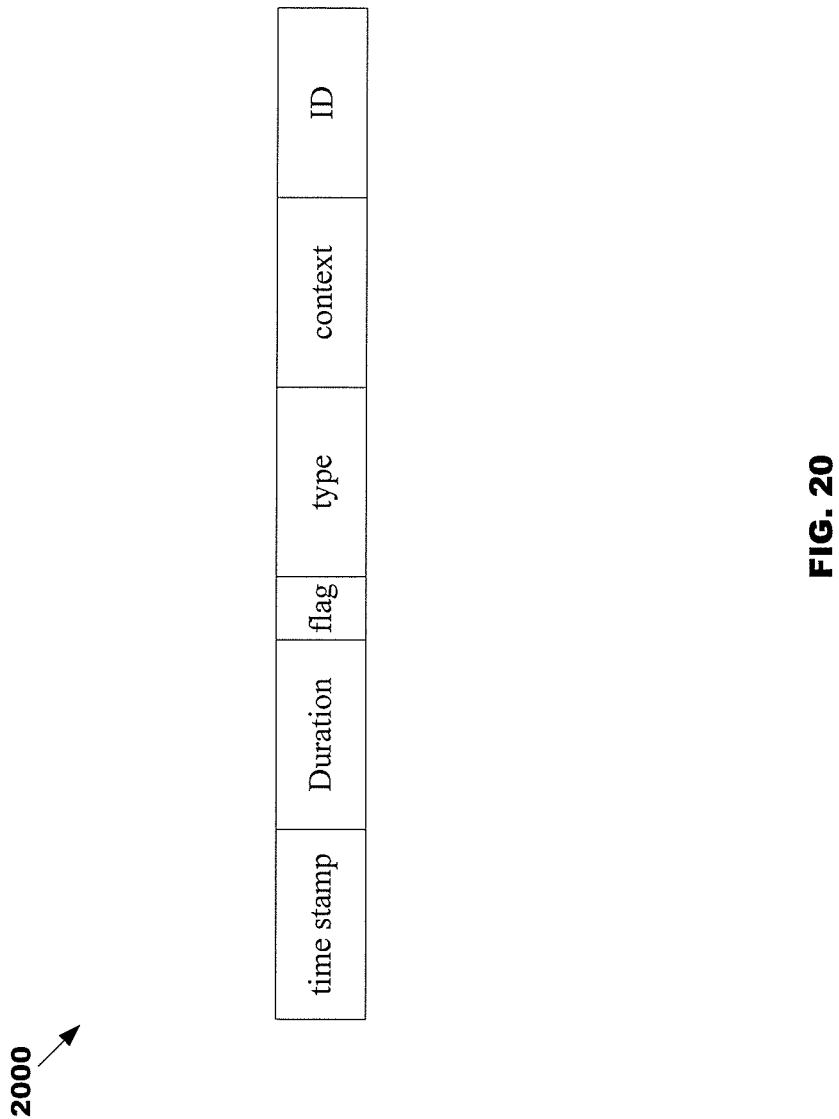
FIG. 20 illustrates an example trigger message format.

Referring now to FIG. 20, FIG. 20 illustrates an example trigger message format 1100. In the example shown, the trigger messages sent by automaton system 104 to devices 114 and server 110 may include the following fields: time stamp; type; context; identifier; duration; and flag. The time stamp field may contain information indicating the time the message was created and/or sent. The type field specifies the type of message. In some embodiments, the following types are available: start, stop, hide, resume, hibernating, awakening. The context field contains information identifying a context. In some embodiments, the following contents are defined: episode, chapter, video, game, and vote. The ID field contains an identifier that uniquely identifies an instance of the specified context. For example, if the context is "video" then the ID field may contain an identifier identifying a particular video. The duration field may contain information indicating the duration of the identified instance of the identified context. So, for example, if the context is "video" and the ID is XYZ, then the duration field may contain information identifying the duration of the XYZ video. The flag field may be used to indicate whether the information in the duration field identifies a fixed duration or an estimated duration. For example, chapters may have estimated durations. Thus, if the context is set to "chapter," then the duration field my identifier an estimated duration of the chapter.

As discussed above, the trigger messages sent by automation system 104 to devices 114 and server 110, typically cause the receiver of the trigger message to perform some action based on the information contained in the trigger message. For example, a trigger message with type=hide and context=video, may cause the receiver to hide the currently playing video. As another example, a trigger message with type=hibernating and context=episode may be sent when the episode is interrupted by a commercial break and may cause the receiver to change the user interface it controls to indicate the break in the episode by, for example, removing some information from the interface or adding a message to the interface.

Episode Creation

Figure 9:
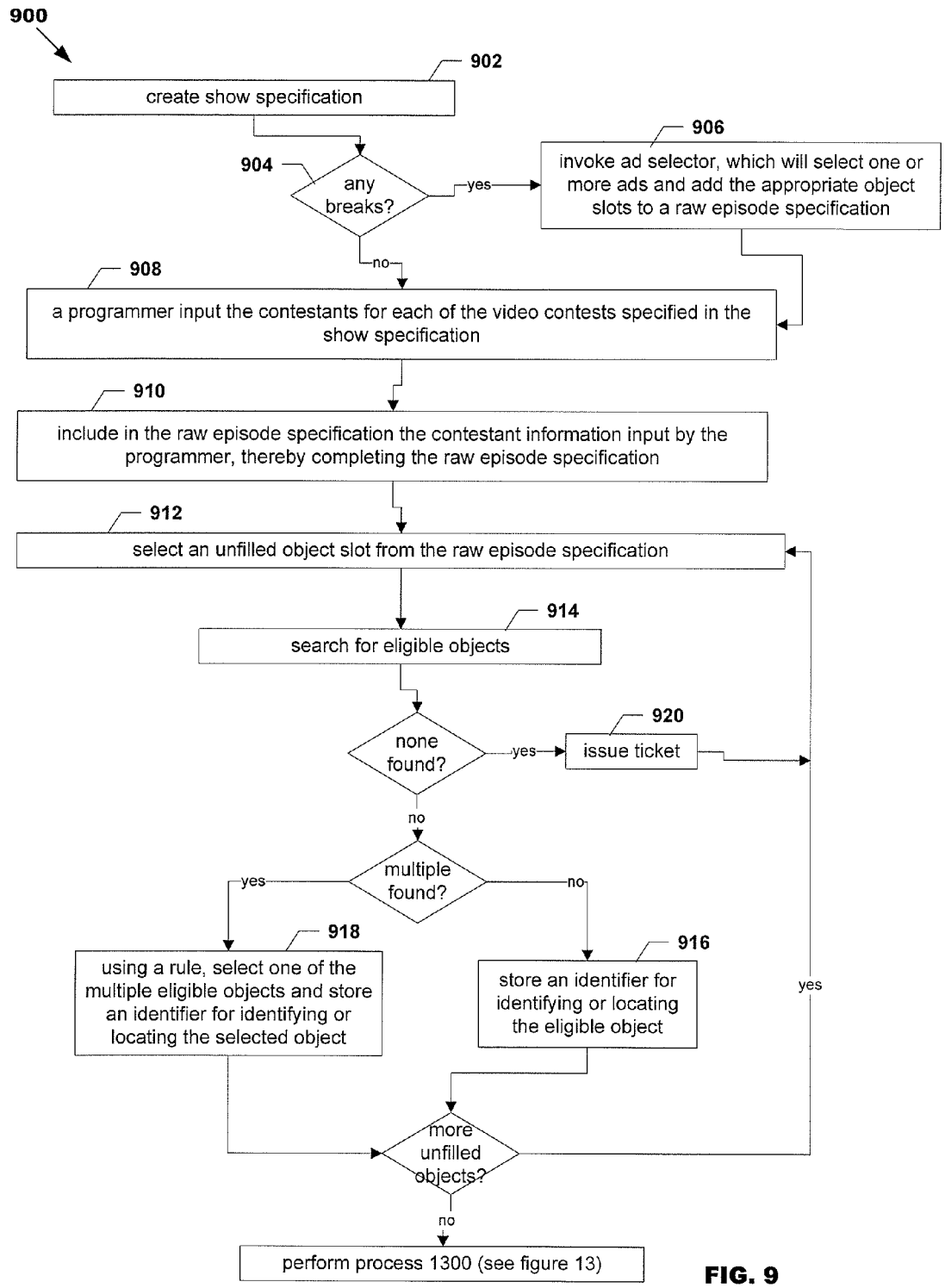
FIG. 9 is flow chart illustrating a process according to an embodiment of the invention.

Referring now to FIG. 9, FIG. 9 is a flow chart illustrating a process 900 for creating an episode of a show, which process includes, among other things, specifying the content that will make up the episode of the show and ensuring that this content can be accessed by the transmission equipment 106. To facilitate illustrating the process of creating an episode of a show, we will use the Music Choice "Fan Faves" show as an example.

The Fan Faves show is a show that allows viewers to select which video will be played next (i.e., in the immediately following chapter) by allowing the viewers to vote for their favorite video from a set of two candidate videos during the current chapter. That is, for example, while one chapter of the episode is on air, the viewers may select the video that will play next by voting for one of the two contestants while the current chapter is being transmitted (e.g., broadcast). In addition, for each of the two contestants, a UGV related to the contestant is shown during some portion of the current chapter (usually the UGVs are shown serially during the beginning of the current chapter as a way to introduce the contestants).

Process 900 may be begin in step 902, in which a specification for the Fan Faves show is created. In some embodiments, each show may have one or more show specifications. A show specification is a starting point for creating an episode of a show.

Figure 10:
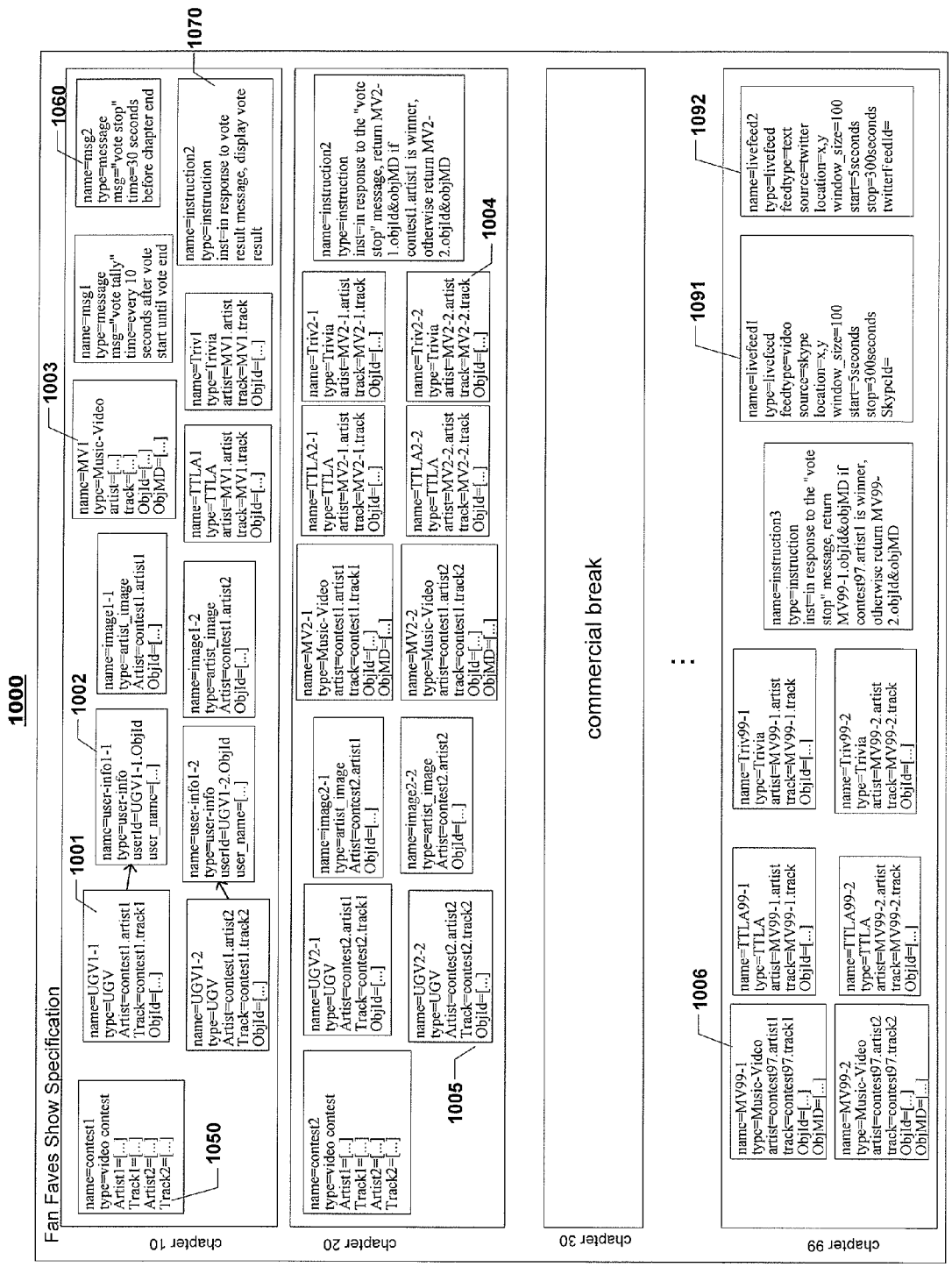
FIG. 10 illustrates an example show specification.

FIG. 10 illustrates an example show specification 1000 for the Fan Faves show. As illustrated in FIG. 10, a show specification may include a set of object slots (e.g., object slots 1001-1006), where each object slot may include a set of one or more attributes. Typically, for each object slot, at least one attribute of the object slot is assigned a value, while one or more others are not yet assigned a any value (or are assigned the "null" value). For example, object slot 1001 includes a "name" attribute that is assigned the value "UGV1-1" and a "type" attribute that is assigned the value "UGV." Object slot 1001 also includes the following attributes: "artist", "track", "objId", and "objMD", and, as shown in FIG. 10, no values have yet been assigned to these attributes. For some attributes, the value assigned to the attribute may be a scalar (i.e., a single value) or a vector (i.e., an ordered sequence of one or more values), whereas for other attributes, the value assigned to the attribute will always be a scalar.

In addition to object slots, show specification 1000 may contain other structures, such as a configuration structure 1050, a message structure 1060, a logic structure 1070, and a live feed structure (e.g., structures 1091 and 1092). Like an object slot, a configuration structure (or other structure) may includes a set of attributes, some of which may be assigned a value. For example, configuration structure 1050 includes a "name" attribute that is assigned the value "contest1" and a "type" attribute that is assigned the value "video contest." Message structure 1060 includes an "msg" attribute for specifying a message, which in this case is a "vote stop" message, and a "time" attribute specifying the time at which the message should be sent. Logic structure 1070 includes an "inst" attribute identifying a process to be performed. More specifically, Logic structure 1070 indicates that in response to system 104 receiving a "vote result" message, which should include a vote tally, system 104 should include in stream 181 and/or 182 data indicating the current vote tally. A live feed structure specifies a live feed that that should be included in stream 181 and/or 182 as well as the time at which the live feed should be included in the stream(s) and the location and size of the window in which the live feed will be displayed. For example, live feed structure 1091 indicates that a Skype video feed should be included in the stream(s) 5 seconds after the start of chapter 99, and live feed structure 1092 indicates that a twitter feed should be included in the stream(s) 5 seconds after the start of chapter 99.

Referring now to object slot 1001, object slot 1001 is an object slot that has a dependent relationship with configuration structure 1050. Object slot 1001 has a dependent relationship with configuration structure 1050 because an attribute of object slot 1001 is assigned a value that is dependent on the value assigned to an attribute of configuration structure 1050. For example, the value assigned to the artist attribute of slot 1001 is "contest1.artist1," which means that the artist attribute of slot 1001 inherits the value that is assigned to the "artist1" attribute of configuration structure 1050.

As shown in FIG. 10, the example specification 1000 for the Fan Faves show specifies that the show will have at least four chapters, including a "commercial break" chapter. The example specification also specifies that each of the first and second chapters comprises two UGVs, a music video, TTLA (title, track, label artist) information, and trivia information. That is, the example specification 1000 defines a set of chapters, and, for each chapter, a set of object slots and/or other structures.

Once the show specification 1000 is obtained, the show specification can be transformed into a finished episode specification. The first step in this process may include determining whether the show specification includes any commercial breaks (see FIG. 9, step 904). If it does, then an ad selector program 1602 is invoked to select ads that will be aired during the specified commercial break, and, for each ad selected, an object slot may be created, which object slot may be filled (i.e., all necessary attributes have been assigned a value) or partially filled (i.e., less than all necessary attributes have been assigned a value) (step 906).

In step 908, a user (a.k.a., a programmer) specifies the "video" contestants for each of the video contests specified in the show specification 1000 (in this case that are two video contests, one during chapter 1 and the other during chapter 2). Likewise, for the Music-Video object slot (i.e., slot 1003), the programmer specifies a music video. In this example, a programmer specifies a video contestant by specifying an artist and a track by the artist. Similarly, the programmer may specify a music video by specifying an artist and a track by the artist.

In some embodiment, a computer program may aid the programmer in specifying the required information. For instance, a computer program could read show specification 1000 and then, for one or more structures defined in the specification (e.g., object slot, configuration structure), prompt the programmer to enter a value for one or more of the attributes to which a value has not already been assigned. As a specific example, the computer program could read show specification 1000 and then, for each configuration structure of type "video contest," prompt the programmer to enter values for the artist and track attributes.

After the programmer provides the required information as described above and the ad selector specifies the ads to for the commercial break, a raw episode specification can be created (step 910), which will ultimately transform into a finished episode specification.

Figure 11:
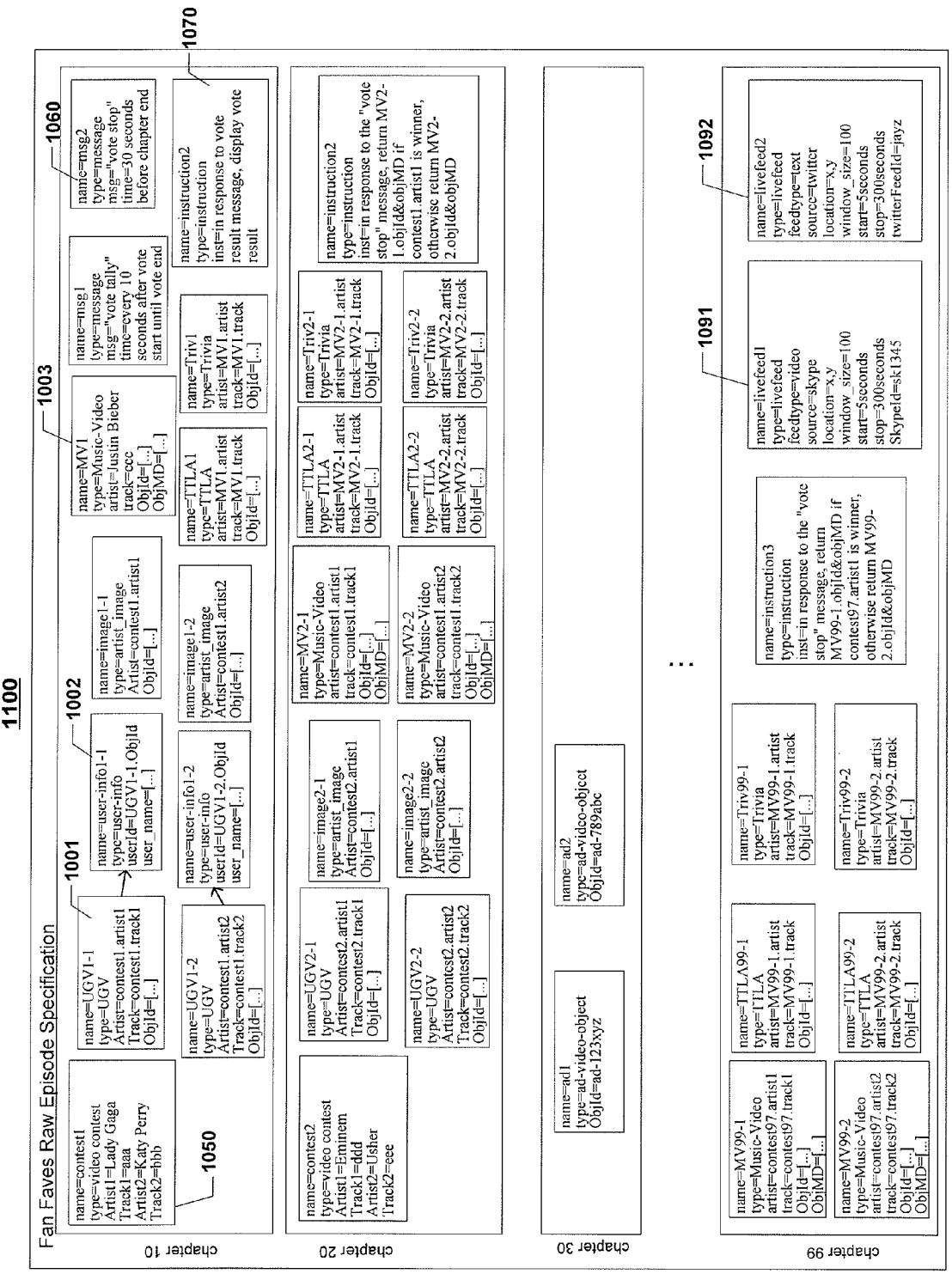
FIG. 11 illustrates an example raw episode specification.

Referring to FIG. 11, FIG. 11 illustrates an example raw episode specification 1100 for the Fan Faves show. Raw episode specification 1100 comprises a set of object slots (e.g., object slots 1001-1006), where each object slot in the set comprises information specifying one or more properties of an eligible object. For the ease of understanding, we shall assume that each object slot specifies the properties of only a single eligible object.

As illustrated, the raw episode specification may be a version of the underlying show specification in which additional values have been assigned to the attributes of the structures. For example, episode specification 1100 may be nearly identical to show specification 1000, with the exception that, in show specification 1000, no values have been assigned to any of the artist/track attributes, whereas, in the episode specification 1100, at least some of the artist/track attributes have been assigned values (in this particular example, all of the artist/track attributes of specification 1100 have been assigned values).

As mentioned above, an object slot may include information specifying the properties of an eligible object. For example, an object slot may include one or more attribute-value pairs (AVPs) and this set of AVPs determines what is and what is not an eligible object. As a specific example, the AVPs of object slot 1001 specify the properties of an eligible object. In this example, the eligible object defined by object slot 1001 is an object that has the following properties: (1) the object is a UGV object; (2) the UGV is associated with Lady Gaga; and (3) the UGV is associated with track "aaa."

After raw episode specification 1100 is created, a ticketing system component 1604 of show creation system 177 will attempt to "fill" each object slot defined in the specification. That is, the ticketing system will perform the following process. The ticketing system selects an object slot from the raw episode specification (step 912). As the example raw episode specification indicates, some object slots have a parent/child relationship. For example, the object slot named "user-info1-1" is child of the object slot named "UGV1-1". Such a relationship means that the child can not be filled until the parent is filled. For example, the system can't know the name of the person who submitted the selected UGV until there exists a selected UGV. Thus, in step 912, a child object slot will not be selected before its parent is selected, and in most cases will not be selected at all, but rather filled along with the parent.

In step 914, the ticketing system will search for an eligible object that matches the eligible object specified by the selected object slot. If the ticketing systems finds only a single object that is eligible, the ticketing system may persist (e.g., store) an identifier for identifying or locating this eligible object (and possible other information, such as meta data pertaining to the eligible object) in a finished episode specification 1200 (see FIG. 12) (step 916). Preferably, this information is persisted in such a way (or stored with other information) such that this information is linked with the object slot or one or more AVPs of the object slot. For example, if the ticketing system finds an eligible object, the ticketing system may include an identifier related to the object (e.g., the object's URI) in a value assigned to the objId attribute of the object slot. If the selected object slot has a child object slot, then, after step 916, the ticketing system may fill the child object slot with information pertaining to or associated with the object that was used to fill the parent. For example, if selected object slot is a UGV object slot, then the selected object will be a UGV. In some embodiments, each UGV is associated with information about the person who created the UGV (e.g., the person's name and hometown). This information may be assigned to one or more attributes in a child of the UGV object slot.

The ticketing system may search for an eligible object by accessing a database 1606 to determine whether a data store (e.g., storage 111) includes an object matching the specified properties of the eligible object. For example, the object slot may specify that, for an object to be an eligible object, the object must be a round image of a particular artist. In this case, ticketing system will search database to determine whether such a round image is stored in the data store. Database base may be any collection of information that includes attribute information about objects stored in the data store. For example, for each of a set of objects in the data store, the database may contain a database record for the object, which database record includes attribute information (e.g., data indicating the type of the object, data indicating an artist with which the object is associated, etc.).

If the result of the search reveals that the data store contains multiple objects that are eligible objects, then the ticketing system will select one of the objects from this set of eligible objects (step 918). Preferably, a predefined rule is used to perform the selection process. For example, ticketing system may select an object from the set of eligible objects by selecting the object that has that has been selected the least number of times since some past point in time. Other object selection rules could also be used. Once an object is selected, the ticketing system may persist an identifier for identifying or locating this selected object (and possible other information, such as meta data pertaining to the eligible object) in the finished episode specification.

If the result of the search reveals that the data store does not contain an eligible object, then the ticketing system will issue an object ticket associated with the object slot (step 920). For example, the ticketing system may issue a ticket by transmitting a message (e.g., an e-mail) to a predefined address (e.g., a predefined e-mail address) and inserting into a ticket database a ticket record containing an identifier identifying the object slot. The ticket record may also contain a time stamp indicating the time at which the ticket was issued.

A dedicated person or team may be responsible for responding to issued tickets. For example, if a ticket was issued because ticketing system could not find a round image for the artist Lady Gaga, then the person handling the ticket may go obtain such an image, place the image in the data store and clear the ticket, Clearing the ticket may include manually filling the object slot with which the ticket is associated or causing the system to automatically fill the object slot.

If the object slot selected in step 912 defines more than one eligible object, then the process may proceed back to step 914. The process will also proceed back to step 912 until the ticketing system has attempted to fill all of the object slots defined in the raw episode specification.

Figure 13:
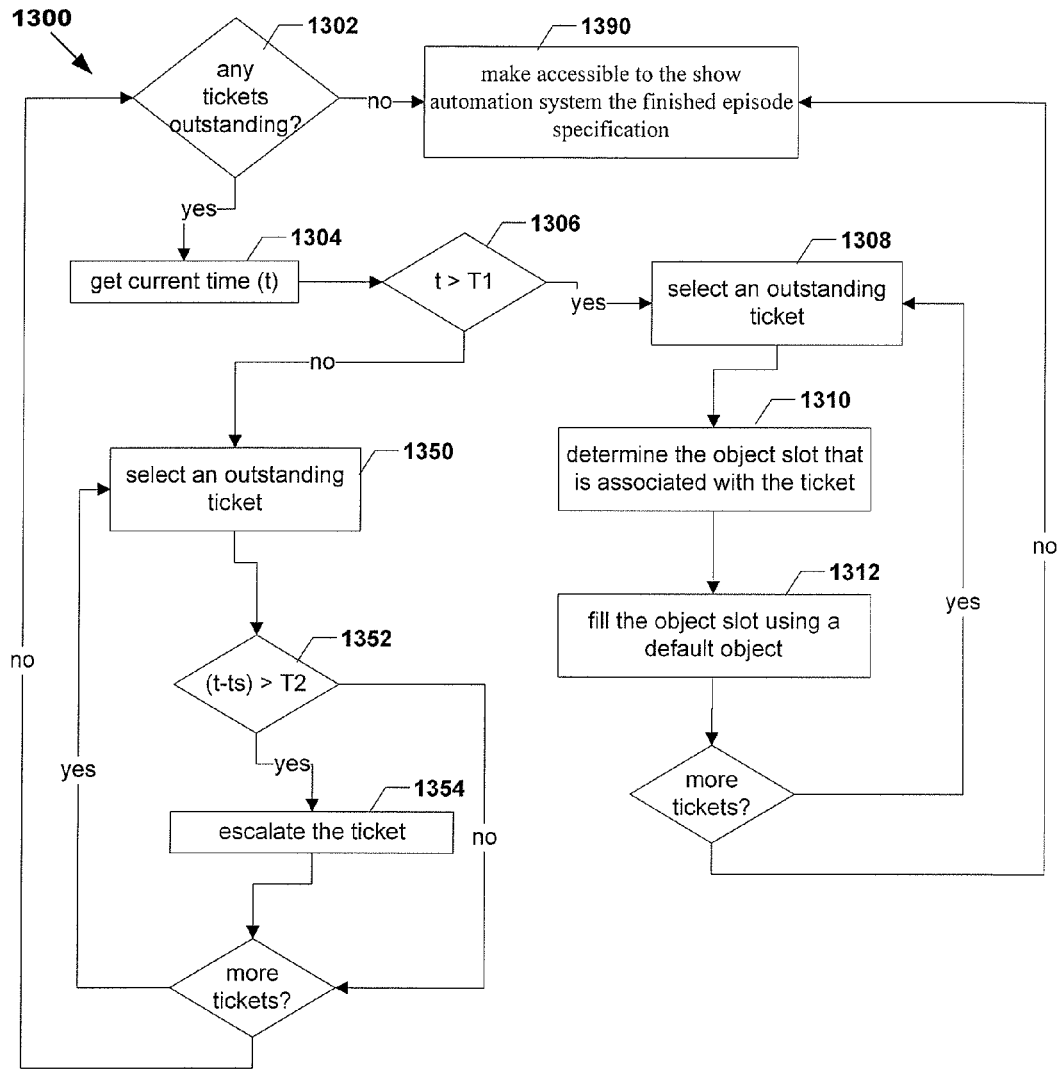
FIG. 13 is flow chart illustrating an object ticketing process according to an embodiment of the invention.

Referring now to FIG. 13, FIG. 13 illustrates a process 1300 for processing issued object tickets. Process 1300 may be performed by the ticketing system. Process 1300 may begin with step 1302.

In step 1302, the ticketing system determines whether all of the tickets that were issued, if any, have already been cleared. If one or more tickets are outstanding, the process proceeds to step 1304, otherwise the process proceeds to step 1390.

In step 1304, the ticketing system checks a clock to obtain the current time. Next (step 1306), the ticketing system will determine whether a time horizon has been passed (e.g., it may determine whether a value (t) representing the current time is greater than a time horizon value (T) representing a specific point in time). If the time horizon has been passed, then the process proceeds to step 1308, otherwise the process proceeds to step 1350.

In step 1308, the ticketing system selects an outstanding ticket. In step 1310, the ticketing system determines the object slot with which the ticket is associated. In step 1312, the ticketing system will search for an eligible default object with which to fill the object slot. For example, if the object slot requires a round image of artist XYZ, then ticketing system will search for a default round image (e.g., a round blank image). That is, the ticketing system may assign to the "objId" attribute of the object slot an object identifier for identifying the default object.

In step 1350, the ticketing system selects an outstanding ticket. In step 1352, the ticketing system compares the current time with the selected ticket's time stamp to determine how long the ticket has been outstanding. If the ticket has been outstanding for more than a threshold (T) amount of time, then the ticketing system may escalate the ticket (e.g., send a second message) (step 1354).

When process 1300 reaches step 1390, this means that all of the object slots in the raw episode specification have been filed, which means that we now have a finished episode specification. In step 1390, this finished episode specification is made available to other components of system 100 (e.g., system 102 and/or back-end server 110). Additionally, each object identified in the finished episode specification may be copied to a production data store (e.g., storage system 108). The finished episode specification itself may be a schedule that controls automation system 104, as discussed above, or it may be transformed into such a schedule. The finished episode specification 1200 illustrated in FIG. 12 could not itself be used as schedule 191 to control the automation system 104 because finished episode specification 1200 lacks, among other things, timing information. However, one could use a schedule template or schedule rules to transform the finished episode specification into a schedule 191.

Dynamic Scheduling

As discussed above, some of the programs transmitted on the interactive video channel are programs that allow viewers to control the content of the program. For example, one program allows viewers to cast a vote indicating that the viewer wants the channel to play a different video than the one currently being played. If enough such votes are casts, the video stops playing and a new one begins right away. As another example, some of the programs transmitted on the interactive video channel are programs that allow viewers to control which video will be played next (i.e., in the immediately following chapter) by allowing the viewers to vote for their favorite video from a set of two or more candidate videos. That is, for example, while one chapter of the episode is on air, the viewers may select which video will play next by voting for the next video while the current video is being sent. This presents a scheduling challenge because, as discussed above, a chapter of an episode includes not only one or more primary elements (e.g., a selected music video) but also a plurality of secondary elements (see FIG. 3), some of which may contain information related to a primary element. Because users ultimately choose a next primary element, it is impossible to know a priori which primary elements will be sent during any particular episode of the show.

Figure 14:
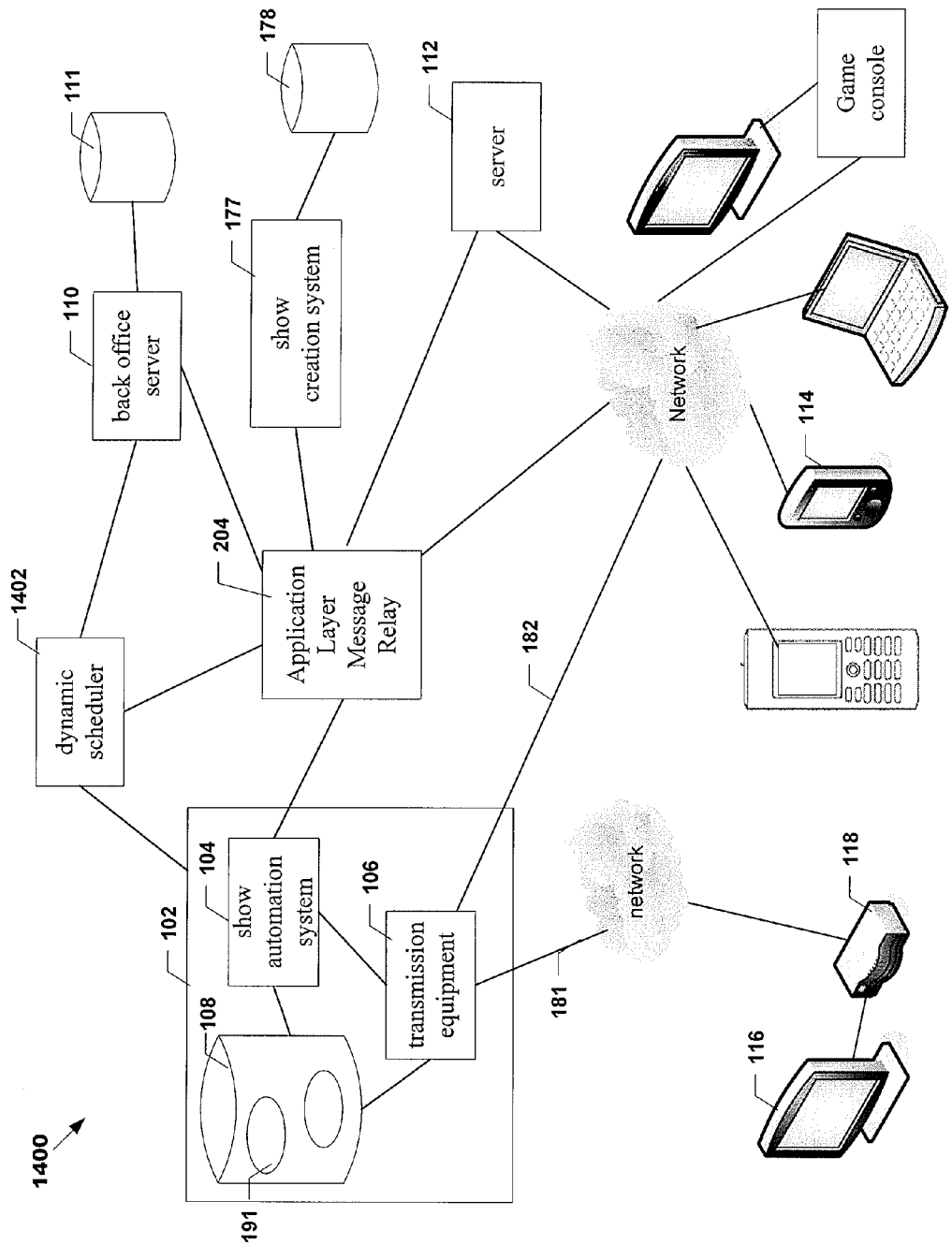
FIG. 14 illustrates an interactive, multi-platform video network according to another embodiment of the invention.

To overcome this problem, systems according to embodiments of the present invention employ a dynamic scheduler 1402 (see FIG. 14). While FIG. 14 shows dynamic scheduler 1402 being separate from system 102 and back office server 110, this is not a requirement, as dynamic scheduler 1402 may be a component of system 102 (e.g., a component of automation system 104) and/or back office server 110. For example, dynamic scheduler 1402 may be a procedure that is activated by a trigger associated with time line 403.

In some embodiments, dynamic scheduler 1402 functions to create, on-the-fly, components of a schedule 191 for an episode. That is, dynamic scheduler 1402 may function to create at least parts of a schedule for an episode while a portion of the episode (e.g., a chapter of the episode) is being sent (e.g., is live). More specifically, in some embodiments, while one chapter of an episode is being sent, dynamic scheduler 1402 may use a finished episode specification that was produced by show creation system 177 to create a schedule for the immediately following chapter or chapters and/or modify the schedule for the live chapter.

Figure 15:
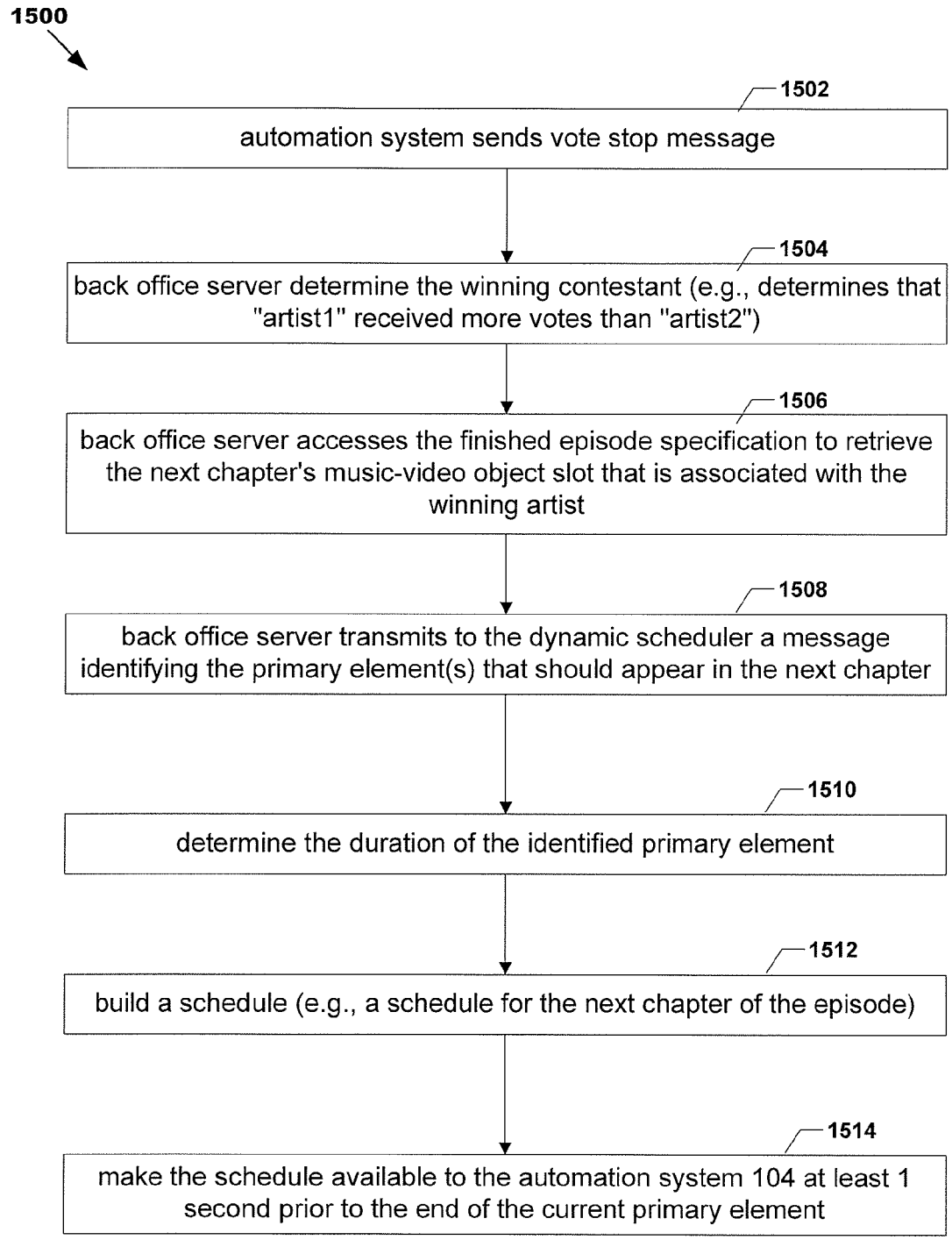
FIG. 15 is a flow chart illustrating a process, according to an embodiment of the invention, that is performed by a dynamic scheduler.
Figure 16:
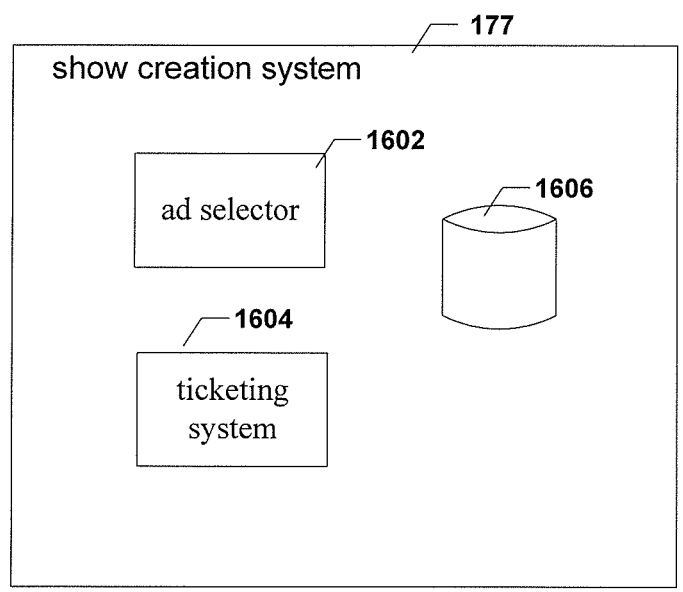
FIG. 16 is a functional block diagram of a show creation system according to an embodiment of the invention.

Referring now to FIG. 15, FIG. 15 illustrates a dynamic scheduling process 1500, according to some embodiments, for creating a schedule for a chapter of an episode of Fan Faves. Process 1500 may be performed while system 102 is transmitting a primary element (a.k.a., the "current primary element").

In step 1502, automation system 104 sends a vote stop message to server 110, as described above. In step 1504, server 110, in response to the message, ends the voting and determines the winning artist. In step 1506, server 110 accesses finished episode specification 1200 to retrieve the next chapter's music-video object slot (or attribute values from the slot) that is associated with the winning artist (e.g., if "artist1" is the winner, then server will retrieve one or more attribute values from the MV2-1 object slot). In some embodiment, at the least, server 110 will retrieve the value assigned to the objId attribute of the object slot. In step 1508, server 110 transmits to scheduler 1402 one or more messages identifying, among other things, the winning video. For example, the message may include the value assigned to the objId attribute of the music-video object slot associated with the winning contestant (one of the messages may also contain the value assigned to the objMD attribute so that the scheduler will have meta data corresponding to the winning music video). In step 1510, the scheduler may determine the duration of the identified video. In step 1512, the scheduler creates a schedule (e.g., a schedule for the next chapter of the episode). The schedule may be created based, at least in part, on the duration of the identified video. In step 1514, the scheduler makes the schedule available to the automation system 104 (e.g., the schedule is made available at least 1 second prior to the end of the current chapter). Further details regarding how scheduler creates a schedule are described in the '255 application.

Computer System

Figure 21:
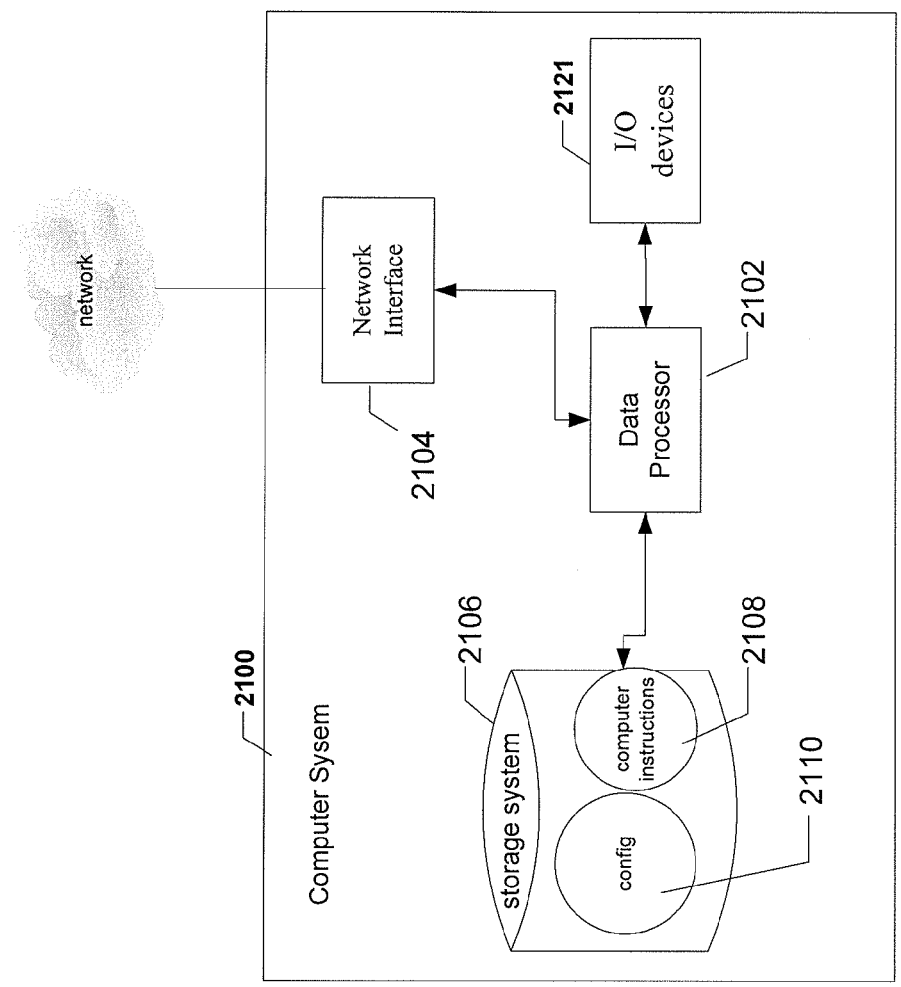
FIG. 21 illustrates an example computer system according to an embodiment of the invention.

Each of the above described systems (e.g., show creation system, show system, etc.) may be computer implemented (e.g., may comprise a set of one or computers and/or data processing devices functioning together). Similarly, each of the above described processes may be computer implemented (e.g., performed in whole or in party by a computer system—e.g., a set of one or computers and/or data processing devices functioning together). FIG. 21 illustrates an example computer system 2100 that may be used to implement any one or more of the above described processes and/or systems.

Computer system 2100 may include: a data processor 602, which may include one or more microprocessors and/or one or more circuits, such as an application specific integrated circuit (ASIC), Field-programmable gate arrays (FPGAs), etc; a network interface 604 for interfacing with a network (e.g., a local area network (LAN)); input/out devices 621 (e.g., a keyboard and display screen); a storage system 606, which may include one or more non-volatile storage devices and/or one or more volatile storage devices (e.g., random access memory (RAM)). In embodiments where data processor 602 includes a microprocessor, computer instructions 608 (i.e., computer readable code means) may be stored in storage system 606. Configuration parameters 610 (e.g., templates, configuration files, etc.) may also be stored. The computer instructions 608 may be embodied in a computer program stored using a computer readable means, such as, but not limited to magnetic media (e.g., a hard disk), optical media (e.g., a DVD), memory devices (e.g., random access memory), etc. In some embodiments, computer instructions 608 are configured such that when computer instructions 608 are executed they cause data processor 602 to perform steps described above (e.g., steps describe above with reference to one or more of the flow charts shown in FIGS. 5, 7, 9, 13, 15, and 18, respectively). In other embodiments, computer 191 is configured to perform steps described above without the need for computer instructions 608. That is, for example, data processor 602 may consist merely of one or more ASICs. Hence, the features of the present invention described above may be implemented in hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. In a computer system comprising a data store storing a library of media objects for use in producing an episode of a show, a computer implemented method for producing an episode of the show, the method comprising:
    (a) accessing a raw episode specification for an episode of the show, the raw episode specification comprising a plurality of media object slots, where each of said plurality of media object slots comprises one or more attribute values specifying one or more properties of an eligible media object;
    (b) for each of said plurality of media object slots:
        accessing a database to determine whether the data store includes a media object matching the specified properties of the eligible media object;
        in response to determining that no media object matching the specified properties of the eligible media object exists, issuing an media object ticket associated with the media object slot;
        in response to determining that only a single media object matching the specified properties of the eligible media object exists, then persisting in a finished episode specification an identifier identifying said matching media object; and in response to determining that two or more media objects matching the specified properties of the eligible media object exists, then selecting one of the two or more media objects using a media object selection rule and persisting in a finished episode specification an identifier identifying the selected media object; and after step (b), enabling a show automation system to access the finished episode specification.

2. The method of claim 1, wherein the step of issuing the ticket comprises transmitting a message to a predefined address.

3. The method of claim 1, further comprising:

after issuing an media object ticket, then, at or after a predetermined point in time, determining whether the ticket is still outstanding;

if it is determined that the ticket is still outstanding, then selecting a default media object having certain properties in common with the eligible media object; and persisting in the finished episode specification an identifier identifying the default media object.

4. The method of claim 1, wherein the step using the predetermined rule comprises:

for each of the two or more media objects, retrieving information identifying the number of times that the media object has been selected since some point in time; and selecting the media object that has been selected the least number of times since said some point in time.

5. The method of claim 1, wherein for each of a plurality of media objects included in the library, the database stores a set of attribute values corresponding to the media object, and the step of accessing the database to determine whether the data store includes a media object matching the specified properties of the eligible media object comprises accessing from the database attribute values corresponding to a media object and comparing the accessed attribute values with the attribute values that specify the properties of the eligible media object to determine if there is a match.

6. The method of claim 1, wherein the raw episode specification further comprises a media object slot comprising first information specifying one or more properties of a first eligible media object and second information specifying one or more properties of a second eligible media object, wherein the set of specified properties of the first eligible media object are different than the set of specified properties of the second eligible media object.

7. The method of claim 6, further comprising:

accessing a database to determine whether a data store includes (i) a media object matching the specified properties of the first eligible media object and (ii) a media object matching the specified properties of the second eligible media object;

in response to determining that no media object matching the specified properties of the first eligible media object exists, issuing an media object ticket associated with the first eligible media object;

in response to determining that no media object matching the specified properties of the second eligible media object exists, issuing an media object ticket associated with the second eligible media object;

in response to determining that one or more media objects matching the specified properties of the first eligible media object exists, then selecting one of the one or more media objects and persisting in the finished episode specification an identifier identifying the selected media object; and in response to determining that one or more media objects matching the specified properties of the second eligible media object exists, then selecting one of the one or more media objects and persisting in the finished episode specification an identifier identifying the selected media object.

8. The method of claim 1, further comprising creating a schedule for the episode of the show using the finished episode specification.

9. The method of claim 1, further comprising creating a schedule for the episode of the show using the finished episode specification and a schedule template associated with the show.

10. A computer system for producing an episode of a show, comprising:

a library of media objects for use in producing the episode of the show;

a raw episode specification for the episode of the show, the raw episode specification comprising a set of media object slots, where each media object slot included in said set comprises one or more attribute values specifying one or more properties of an eligible media object; and a ticketing system comprising one or more processor configured such that, for each said media object slot, the ticketing system:

determines whether the library of media objects includes a media object matching the specified properties of the eligible media object;

issues a media object ticket associated with the media object slot in response to determining that no media object matching the specified properties of the eligible media object exists;

selects one of the one or more media objects in response to determining that one or more media objects matching the specified properties of the eligible media object exists; and persists in a finished episode specification an identifier identifying the selected media object, wherein the computer system is configured to enable a show automation system to access the finished episode specification.

11. The system of claim 10, wherein the ticketing system is configured to issue the ticket by transmitting a message to a predefined address.

12. The system of claim 10, wherein the ticketing system is configured such that, in response to determining that a ticket associated with a particular eligible media object has been outstanding for more than a threshold amount of time, the ticketing system selects a default media object having certain properties in common with an eligible media object and persists in the finished episode specification an identifier identifying the default media object.

13. The system of claim 10, wherein the ticketing system is configured such that, if two or more media objects match the specified properties of the eligible media object, the ticketing system uses a predetermined rule to select one of the two or more media objects.

14. The system of claim 10, wherein for each of one or more media objects included in the library, a database stores a set of attribute values corresponding to the media object.

15. The system of claim 10, wherein the raw episode specification further comprises a media object slot comprising first information specifying one or more properties of a first eligible media object and second information specifying one or more properties of a second eligible media object, wherein the set of specified properties of the first eligible media object are different than the set of specified properties of the second eligible media object.

16. The system of claim 15, wherein the ticketing system is configured to perform a method comprising:

accessing a database to determine whether a data store includes (i) a media object matching the specified properties of the first eligible media object and (ii) a media object matching the specified properties of the second eligible media object;

in response to determining that no media object matching the specified properties of the first eligible media object exists, issuing a media object ticket associated with the first eligible media object;

in response to determining that no media object matching the specified properties of the second eligible media object exists, issuing a media object ticket associated with the second eligible media object;

in response to determining that one or more media objects matching the specified properties of the first eligible media object exists, then selecting one of the one or more media objects and persisting in the finished episode specification an identifier identifying the selected media object; and in response to determining that one or more media objects matching the specified properties of the second eligible media object exists, then selecting one of the one or more media objects and persisting in the finished episode specification an identifier identifying the selected media object.

17. The system of claim 10, wherein the ticketing system is configured to create a schedule for the episode of the show using the finished episode specification.

18. The system of claim 10, wherein the ticketing system is configured to create a schedule for the episode of the show using the finished episode specification and a schedule template associated with the show.

19. The system of claim 10, further comprising a show automation system that uses the finished episode specification to create the episode of the show.

* * * * *